United States Patent
Matsumoto et al.

(10) Patent No.: US 8,189,221 B2
(45) Date of Patent: May 29, 2012

(54) IMAGE FORMING DEVICE FOR EXECUTING A DESIGNATED PROCESS WITH PRIORITY WITHOUT CANCELING A PREVIOUSLY ACCEPTED PROCESS

(75) Inventors: Yutaka Matsumoto, Saitama (JP); Hiroshi Gotoh, Tokyo (JP); Satoshi Miyazaki, Kanagawa (JP); Takeshi Yoshizumi, Tokyo (JP); Naohiko Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1068 days.

(21) Appl. No.: 12/078,579

(22) Filed: Apr. 2, 2008

(65) Prior Publication Data

US 2008/0246994 A1    Oct. 9, 2008

(30) Foreign Application Priority Data

Apr. 5, 2007   (JP) ................... 2007-099668

(51) Int. Cl.
  *G06F 15/00*   (2006.01)
  *G06F 3/12*   (2006.01)
  *G06K 1/00*   (2006.01)
(52) U.S. Cl. ................. 358/1.15; 358/1.13
(58) Field of Classification Search .............. None
  See application file for complete search history.

(56) References Cited

U.S. PATENT DOCUMENTS

| 6,219,502 B1 | 4/2001 | Osari et al. | |
|---|---|---|---|
| 2005/0200889 A1* | 9/2005 | Oomura | 358/1.15 |
| 2007/0223027 A1 | 9/2007 | Shindo et al. | |

FOREIGN PATENT DOCUMENTS

| JP | 10-177464 | 6/1998 |
|---|---|---|
| JP | 11-188948 | 7/1999 |
| JP | 2001-296980 | 10/2001 |
| JP | 2002-007090 | 1/2002 |
| JP | 2003-118209 | 4/2003 |
| JP | 2004-188677 | 7/2004 |
| JP | 2005-267176 | 9/2005 |
| JP | 2005-349768 | 12/2005 |
| JP | 2007-245673 | 9/2007 |

OTHER PUBLICATIONS

Japanese Office Action dated Feb. 28, 2012.

* cited by examiner

*Primary Examiner* — Douglas Tran
(74) *Attorney, Agent, or Firm* — IPUSA, PLLC

(57) ABSTRACT

In an image forming device, when a priority of outputting input data determined by a priority determining unit is higher than a priority of in-process data during image expansion performed by one of PDL interpreter units, a PDL control unit determines whether the one of the PDL interpreter units supports an interruption process, and an output sequence changing unit changes an output sequence stored in an output sequence storing unit such that, when the one of the PDL interpreter units supports the interruption process, another of the PDL interpreter units performs image expansion of the input data earlier than the image expansion of the in-process data, and when the one of the PDL interpreter units does not support the interruption process, another of the PDL interpreter units performs the image expansion of the input data later than the image expansion of the in-process data.

9 Claims, 20 Drawing Sheets

FIG.4A

OUTPUT SEQUENCE →

| ID | 1 | 2 | 3 | ... |
|---|---|---|---|---|
| COMMUNICATION PORT | 9101 | 9100 | 9102 | |
| PRIORITY | 1 | 0 | 2 | |
| STATE | IN PROGRESS | WAITING | WAITING | |
| PDL | PDL1 | — | — | |
| ... | ... | ... | ... | |

FIG.4B

OUTPUT SEQUENCE →

| ID | 3 | 1 | 2 | ... |
|---|---|---|---|---|
| COMMUNICATION PORT | 9102 | 9101 | 9100 | |
| PRIORITY | 2 | 1 | 0 | |
| STATE | IN PROGRESS | STOP | WAITING | |
| PDL | PDL2 | PDL1 | — | |
| ... | ... | ... | ... | |

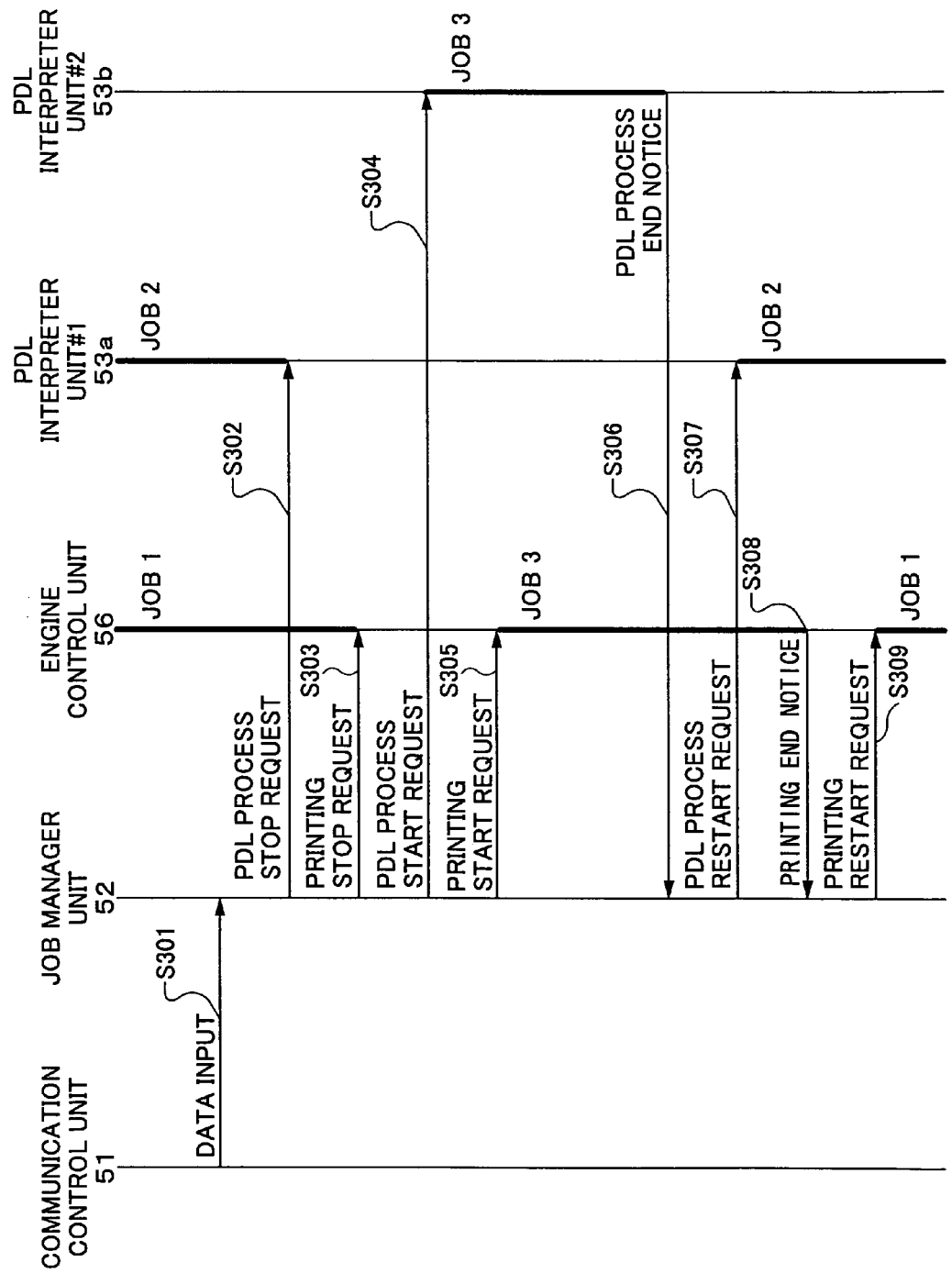

FIG.8A

| RAW PORT NUMBER | PRIORITY |
|---|---|
| 9100 | 0 |
| 9101 | 1 |
| 9102 | 2 |

FIG.8B

| COMMUNICATION PROTOCOL | PRIORITY |
|---|---|
| RAW PORT | 0 |
| LPR | 1 |
| Apple Talk | 2 |
| IPP | 1 |

FIG.8C

| PRINTER NAME | PRIORITY |
|---|---|
| "lp1" | 0 |
| "lp2" | 1 |
| "lp3" | 2 |
| "lp4" | 3 |

FIG.9A

| ID | 1 | 2 | ... |
|---|---|---|---|
| PRIORITY | 1 | 1 | |
| PDL PROCESS STATE | IN PROGRESS | WAITING | |
| PDL | PDL1 | — | |
| PRINTING STATE | IN PROGRESS | WAITING | |
| ... | ... | | |

OUTPUT SEQUENCE →

FIG.9B

| ID | 1 | 2 | 3 | ... |
|---|---|---|---|---|
| PRIORITY | 1 | 1 | 2 | |
| PDL PROCESS STATE | IN PROGRESS | WAITING | WAITING | |
| PDL | PDL1 | — | — | |
| PRINTING STATE | IN PROGRESS | WAITING | WAITING | |
| ... | ... | | | |

OUTPUT SEQUENCE →

FIG.9C

OUTPUT SEQUENCE →

| ID | 1 | 2 | 3 | ... |
|---|---|---|---|---|
| PRIORITY | 1 | 1 | 2 | |
| PDL PROCESS STATE | END OF PROCESS | WAITING | WAITING | |
| PDL | — | — | — | |
| PRINTING STATE | IN PROGRESS | WAITING | WAITING | |
| ... | ... | | | |

FIG.9D

OUTPUT SEQUENCE →

| ID | 3 | 1 | 2 | ... |
|---|---|---|---|---|
| PRIORITY | 2 | 1 | 1 | |
| PDL PROCESS STATE | IN PROGRESS | END OF PROCESS | WAITING | |
| PDL | PDL2 | — | — | |
| PRINTING STATE | IN PROGRESS | STOP | WAITING | |
| ... | ... | | | |

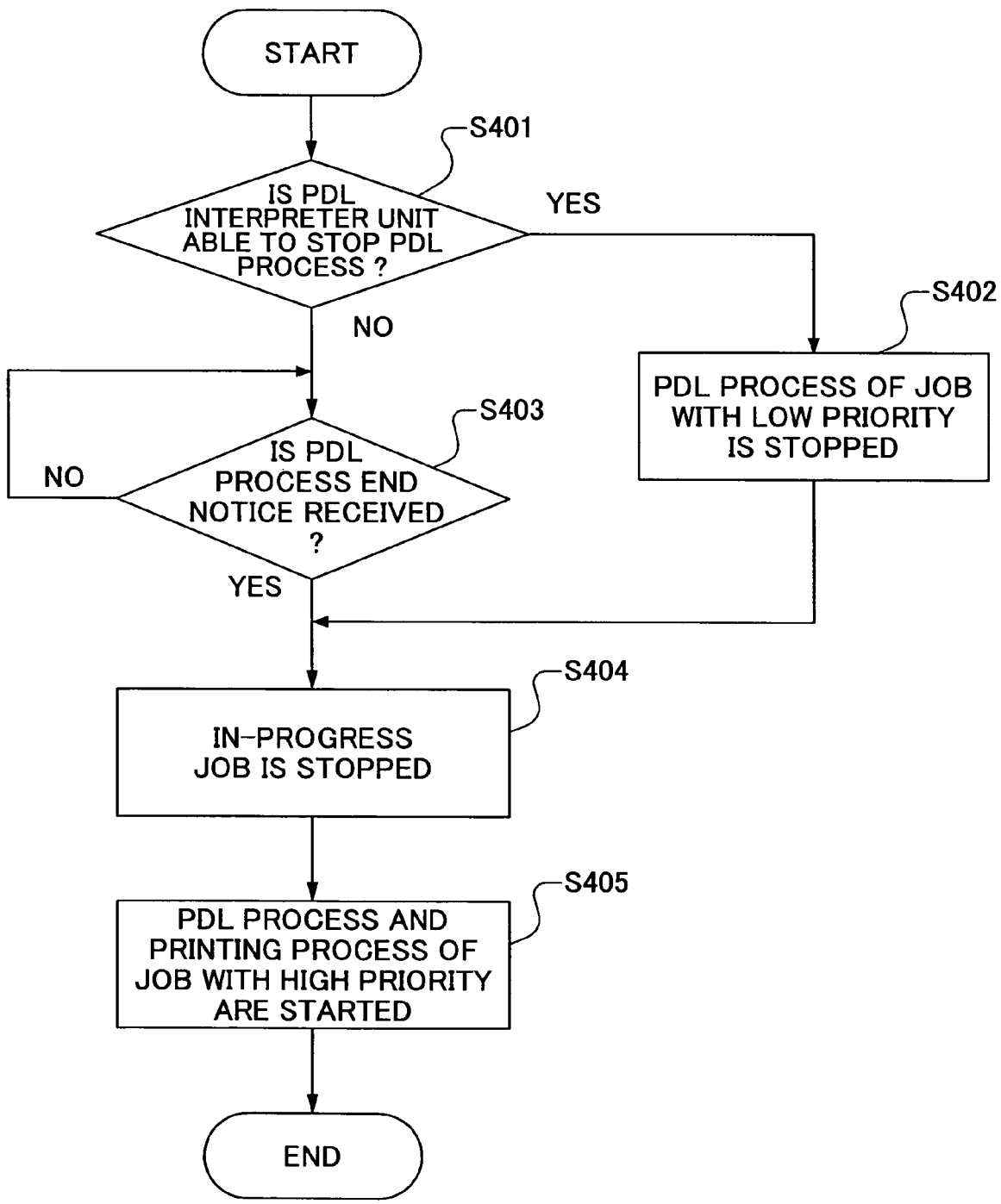

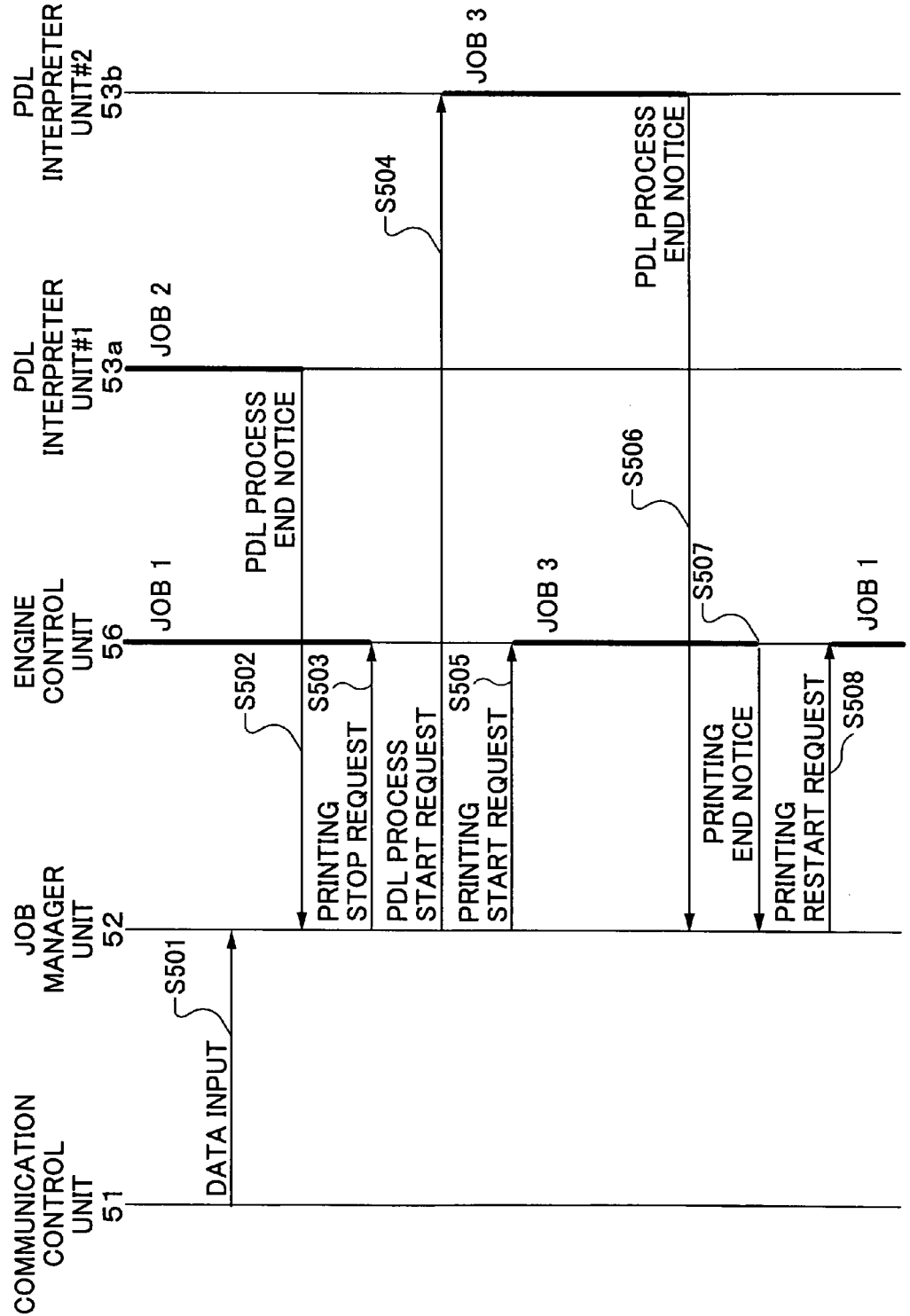

version =XXXX — 620
pdl_name=YYYY — 622
interrupt =support — 624
.
.
.

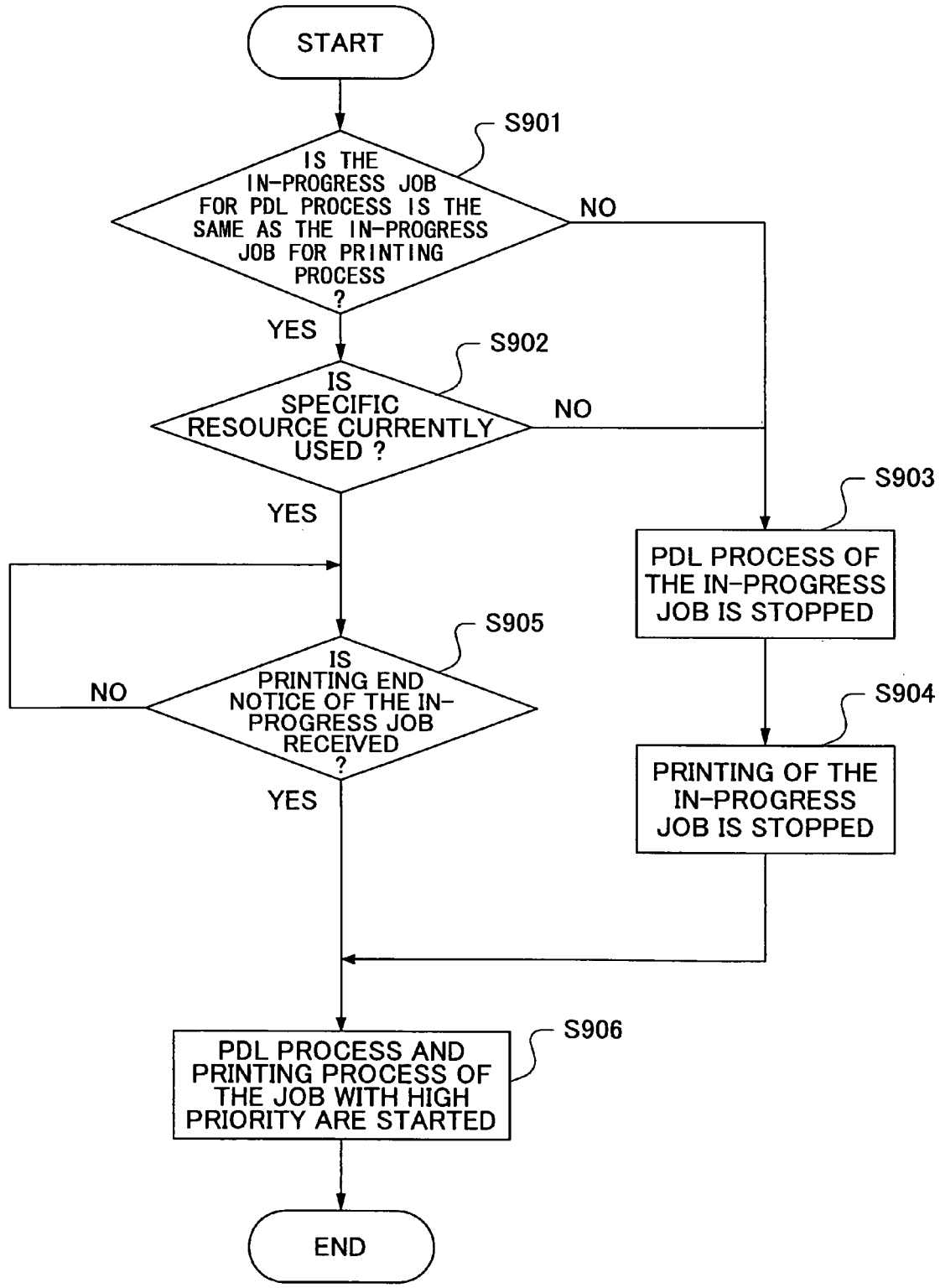

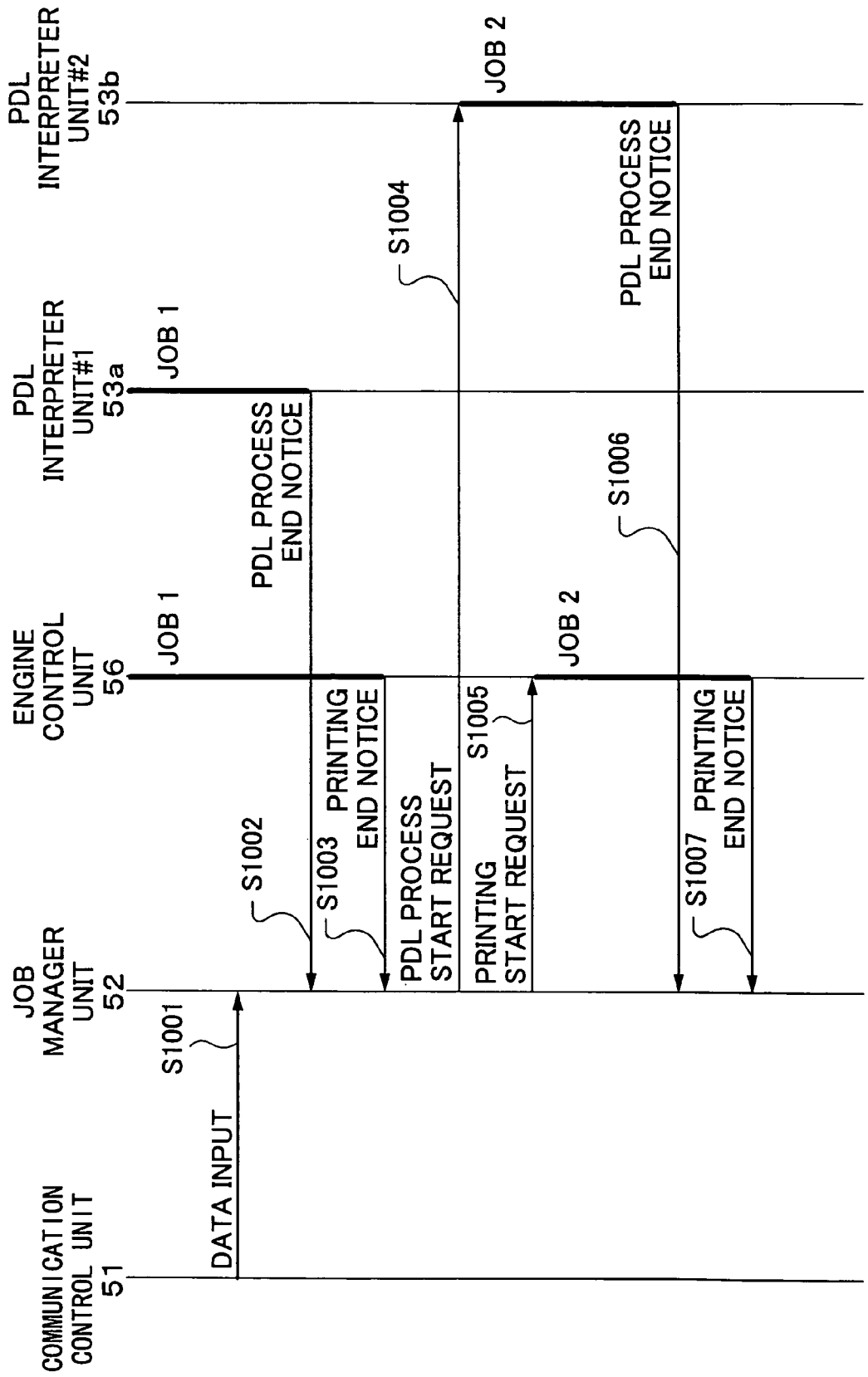

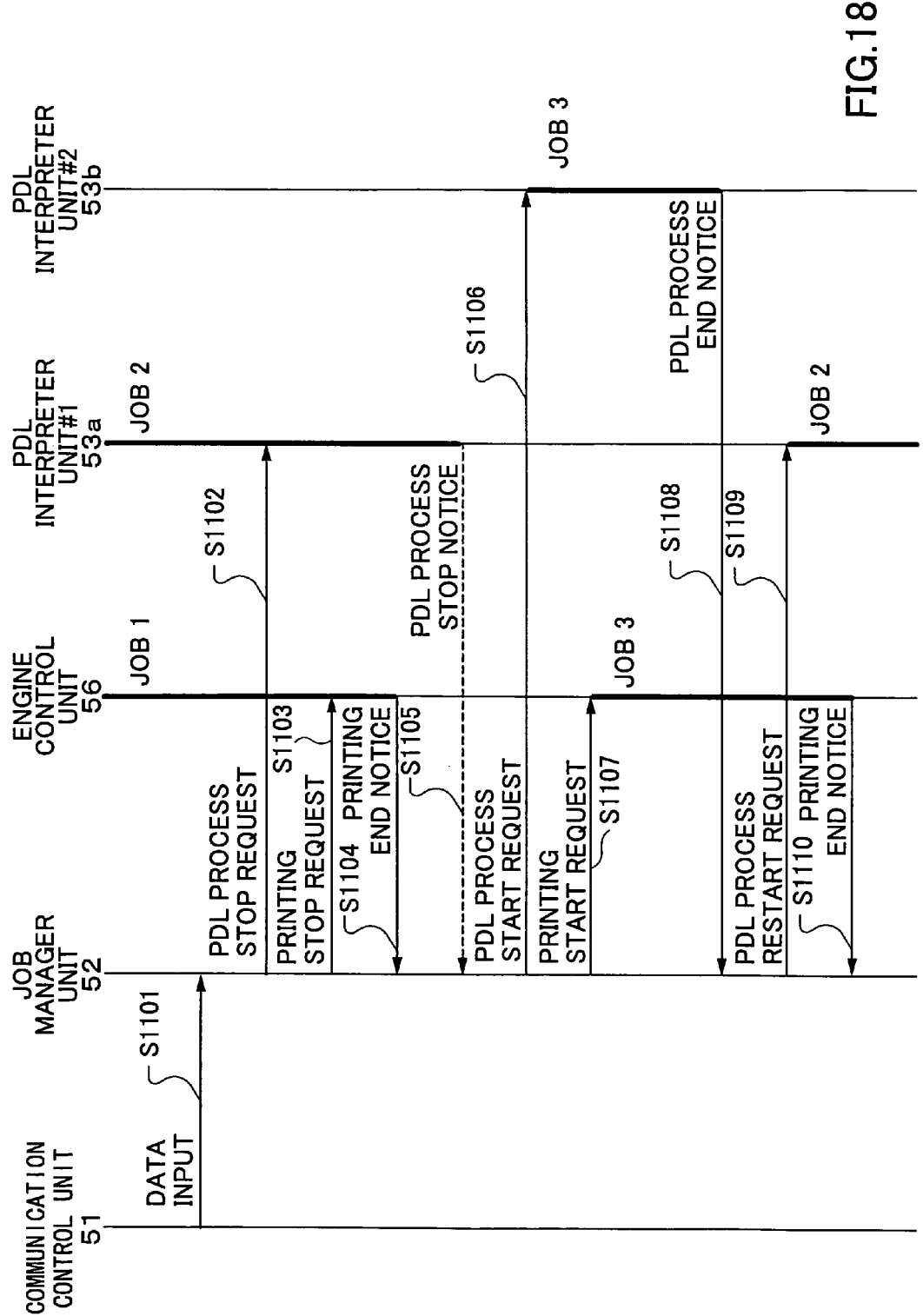

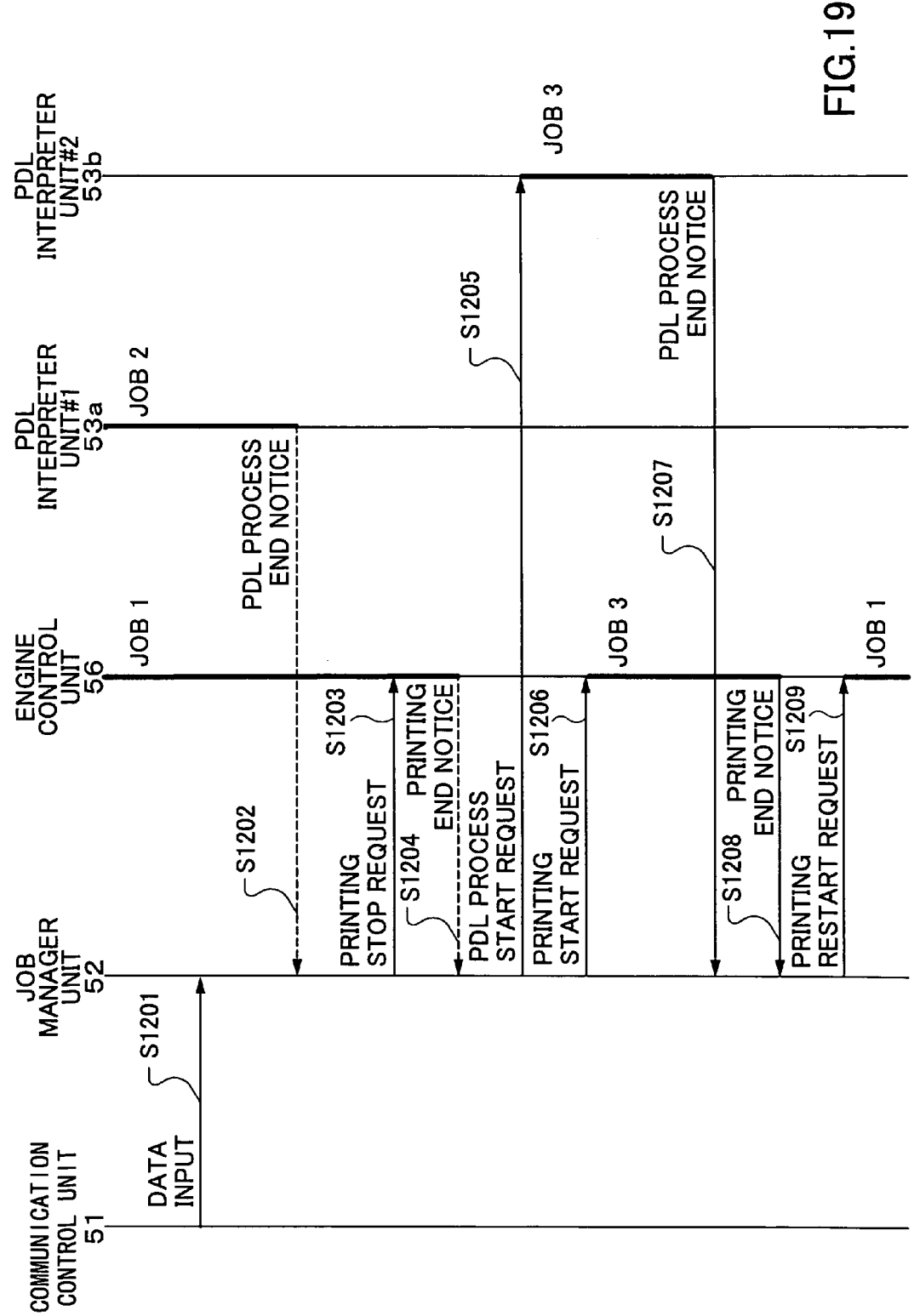

IMAGE FORMING DEVICE FOR EXECUTING A DESIGNATED PROCESS WITH PRIORITY WITHOUT CANCELING A PREVIOUSLY ACCEPTED PROCESS

BACKGROUND OF THE INVENTION

1. Field of the Invention

This invention relates to an image forming device which is capable of performing an interruption process, and a program and recording medium for use in the image forming device.

2. Description of the Related Art

Conventionally, in an image forming device, such as a printer, when a different printing request is received during execution of a print job, a new print job corresponding to the printing request is performed after all the previously accepted print jobs are completed. To allow the new print job to be performed immediately, it is necessary to cancel the previously accepted print jobs the execution of which is incomplete. Therefore, it is demanded that priority be given to a designated print job and the designated print job with the priority be executed without canceling the previously accepted print jobs.

For example, Japanese Laid-Open Patent Application No. 2003-118209 discloses a job management device in which a high priority is given to a job of a special kind to enable the job of the special kind to be executed preferentially over individual jobs with their priority. In this job management device, a plurality of jobs are managed, and this job management device includes a priority job designating unit which designates priority jobs which are preferentially performed over individual jobs, and a highest priority job registering unit which registers a job of a special kind to which a high priority over the priority jobs designated by the priority job designating unit is given.

The job management device of Japanese Laid-Open Patent Application No. 2003-118209 is able to change the sequence of execution of the jobs by assigning priority to each job. However, the practical image forming device has a difficulty in interrupting the in-progress execution of image expansion of a PDL (page description language) print job in order to start a PDL interpretation process of a different print job.

Moreover, in many cases, a PDL module is supplied as an optional component of an image forming device, and there may be a case in which the interruption process is not supported by PDL modules of some previous versions. In addition, the practical image forming device operates under various restrictions and there may be a case in which performing the interruption process immediately is difficult due to the restrictions.

SUMMARY OF THE INVENTION

In one aspect of the invention, an improved image forming device is disclosed in which the above-described problems are eliminated.

In one aspect of the invention, an image forming device is disclosed which is able to give priority to and process a following job, without canceling the in-progress job, even when execution of the interruption process is restricted due to the operating states and functions.

In an embodiment of the invention which solves or reduces one or more of the above-mentioned problems, an image forming device is disclosed which forms an image based on input data, the image forming device comprising: an output sequence storing unit storing information concerning the input data, and storing an output sequence according to a sequence of reception of items of the information; a priority determining unit determining a priority of outputting the input data; an output sequence changing unit changing the output sequence stored in the output sequence storing unit in accordance with the priority determined by the priority determining unit; a plurality of PDL interpreter units performing image expansion of the input data; and a PDL control unit controlling the plurality of PDL interpreter units to perform image expansion of the input data in accordance with the output sequence stored in the output sequence storing unit, wherein, when the priority of outputting the input data determined by the priority determining unit is higher than a priority of in-process data during image expansion performed by at least one of the plurality of PDL interpreter units, the PDL control unit determines whether the at least one of the plurality of PDL interpreter units supports an interruption process, and the output sequence changing unit changes the output sequence stored in the output sequence storing unit such that, when the at least one of the plurality of PDL interpreter units supports the interruption process, another of the plurality of PDL interpreter units performs image expansion of the input data earlier than the image expansion of the in-process data, and when the at least one of the plurality of PDL interpreter units does not support the interruption process, another of the plurality of PDL interpreter units performs the image expansion of the input data later than the image expansion of the in-process data.

The above-mentioned image forming device may be configured so that each of the plurality of PDL interpreter units includes a configuration file containing an item indicating whether the PDL interpreter unit supports the interruption process, and the PDL control unit determines whether each PDL interpreter unit supports the interruption process, based on the item contained in the configuration file of the PDL interpreter unit.

The above-mentioned image forming device may be configured to further comprise an output control unit outputting image data obtained as a result of image expansion by each of the plurality of PDL interpreter units, in accordance with the output sequence stored in the output sequence storing unit, wherein, when the priority of outputting the input data determined by the priority determining unit is higher than a priority of in-process image data currently output by the output control unit, the output sequence changing unit changes the output sequence stored in the output sequence storing unit such that, when it is determined, from information stored in the output sequence storing unit, that a specific resource used for outputting the in-process image data is used for outputting image data based on the input data, the image data based on the input data is output later than the outputting of the in-process image data, and when it is determined that the specific resource is not used for outputting the image data based on the input data, the image data based on the input data is output earlier than the outputting of the in-process image data.

The above-mentioned image forming device may be configured so that, when the determination as to whether the resource is used for outputting the image data based on the input data is allowed only from image data obtained as a result of image expansion by each of the plurality of PDL interpreter units, the output sequence changing unit changes the output sequence stored in the output sequence storing unit such that the image data based on the input data is output after the outputting of the in-process image data by the output control unit.

The above-mentioned image forming device may be configured so that, when it is determined that the resource is used for outputting the image data based on the input data, the output control unit releases the resource currently used, and the output sequence changing unit changes the output sequence stored in the output sequence storing unit such that the image data based on the input data is output earlier than the outputting of the in-process image data.

The above-mentioned image forming device may be configured so that, when it is determined, from the information stored in the output sequence storing unit, that the in-process image data currently output by the output control unit is based on image data obtained as a result of image expansion by one of the plurality of PDL interpreter units, the output sequence changing unit changes the output sequence stored in the output sequence storing unit such that the image data based on the input data is output later than the outputting of the in-process image data.

The above-mentioned image forming device may be configured to further comprise a request transmitting unit which transmits to the PDL control unit a first stop request for suspending image expansion by each of the plurality of PDL interpreter units, and transmits to the output control unit a second stop request for suspending outputting of image data by the output control unit, in accordance with the output sequence stored in the output sequence storing unit, wherein the request transmitting unit is arranged to transmit the first stop request and the second stop request successively or simultaneously.

The above-mentioned image forming device may be configured so that, when the PDL control unit determines that the at least one of the plurality of PDL interpreter units supports the interruption process, the request transmitting unit transmits the first stop request to the PDL control unit and the PDL control unit suspends image expansion by the at least one of the plurality of PDL interpreter units in response to the first stop request, and causes another of the plurality of PDL interpreter units to perform image expansion of the input data, and when the PDL control unit determines that the at least one PDL interpreter unit does not support the interruption process, the PDL control unit causes another of the plurality of PDL interpreter units to perform image expansion of the input data after the image expansion by the at least one of the plurality of PDL interpreter units is completed.

In an embodiment of the invention which solves or reduces one or more of the above-mentioned problems, a computer-readable program is disclosed which, when executed by a computer, causes the computer to perform an image forming method for use in an image forming device which forms an image based on input data, the method comprising the steps of: storing information concerning the input data, and storing an output sequence according to a sequence of reception of items of the information; determining a priority of outputting the input data; changing the stored output sequence in accordance with the priority determined in the determining step; performing image expansion of the input data in accordance with the output sequence stored in the storing step; and determining whether an interruption process is supported for the image expansion, when the priority of outputting the input data is higher than a priority of in-process data during the image expansion, wherein the stored output sequence is changed such that, when the interruption process is supported, image expansion of the input data is performed earlier than the image expansion of the in-process data, and when the interruption process is not supported, the image expansion of the input data is performed later than the image expansion of the in-process data.

In an embodiment of the invention which solves or reduces one or more of the above-mentioned problems, a computer-readable recording medium is disclosed on which the above-mentioned computer-readable program is recorded.

According to the embodiments of the image forming device of the invention, it is possible to provide an image forming device which is able to give priority to and process a following job without canceling the in-progress job even when execution of the interruption process is restricted due to the operating states and functions.

BRIEF DESCRIPTION OF THE DRAWINGS

Other objects, features and advantages of the present invention will be apparent from the following detailed description when reading in conjunction with the accompanying drawings.

FIG. 4A and FIG. 4B are diagrams showing an example of data configuration before and after an output sequence of an output sequence storing unit is changed in the image forming device of a first embodiment of the invention (embodiment 1).

FIG. 7 is a sequence diagram for explaining the operation of respective modules in the image forming device of embodiment 1 when the output sequence is changed according to the input data with a high priority.

FIG. 8A, FIG. 8B and FIG. 8C are diagrams showing examples of priority determination table which are set up according to the Raw port number, the communication protocol, and the printer name, respectively.

FIG. 9A, FIG. 9B, FIG. 9C and FIG. 9D are diagrams showing an example of data configuration before and after an output sequence of an output sequence storing unit is changed in the image forming device of a second embodiment of the invention (embodiment 2).

FIG. 10 is a flowchart for explaining the operation of a job process of the image forming device of embodiment 2.

FIG. 11 is a sequence diagram for explaining the operation of respective modules in the image forming device of embodiment 2 when a PDL interpreter unit does not support the interruption process.

FIG. 16 is a flowchart for explaining the operation of a job process of the image forming device of a fifth embodiment of the invention (embodiment 5).

FIG. 17 is a sequence diagram for explaining the operation of respective modules in the image forming device embodiment 5 when the object job of each of the in-progress PDL interpretation process and printout process is the same.

FIG. 18 is a sequence diagram for explaining the operation of respective modules in the image forming device of a sixth embodiment of the invention (embodiment 6) in which respective stop requests are transmitted successively or simultaneously to the in-progress PDL interpretation process and printout process at the time of receiving a job with a high priority.

FIG. 19 is a sequence diagram for explaining the operation of respective modules in the image forming device of a seventh embodiment of the invention (embodiment 7) in which a stop request to the printout process is transmitted after the in-progress PDL interpretation process at the time of receiving a job with a high priority is completed.

DETAILED DESCRIPTION OF PREFERRED EMBODIMENTS

A description will be given of embodiments of the invention with reference to the accompanying drawings.

Figure 1:
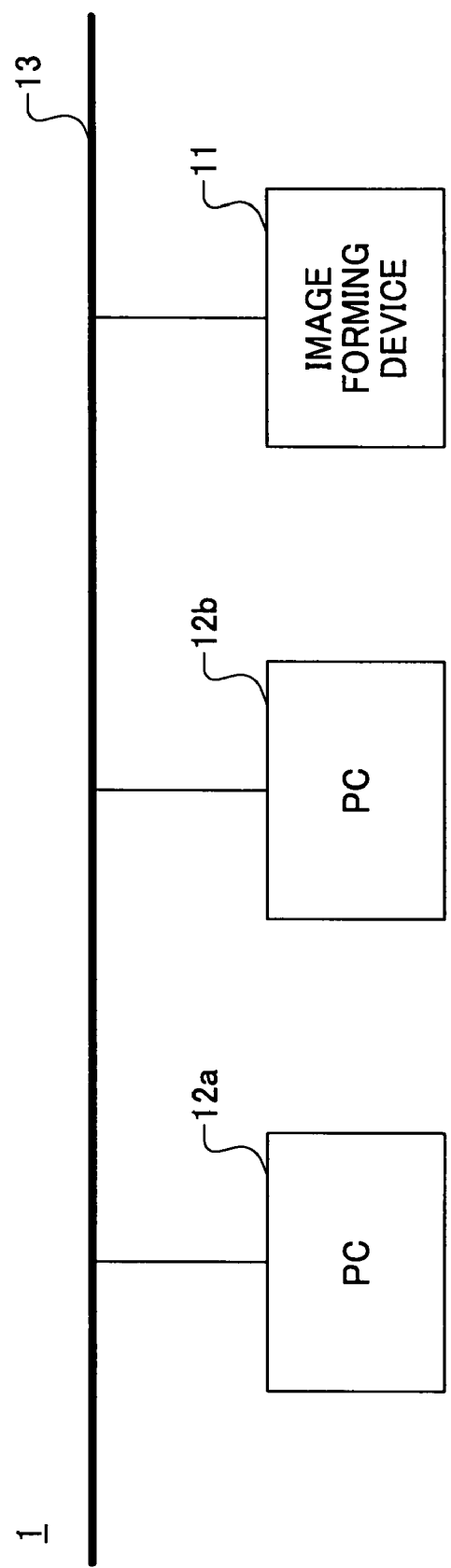
FIG. 1 is a block diagram showing the composition of an image forming system including an image forming device in an embodiment of the invention.

FIG. 1 shows the composition of an image forming system including an image forming device in an embodiment of the invention.

In the image forming system 1 of FIG. 1, an image forming device 11 is connected to host devices 12a and 12b, such as a personal computer (PC) or server, via a network 13, such as a LAN (local area network). The image forming device 11 is capable of transmitting data to and receiving data from the PC 12a or 12b through the network 13.

Figure 2:
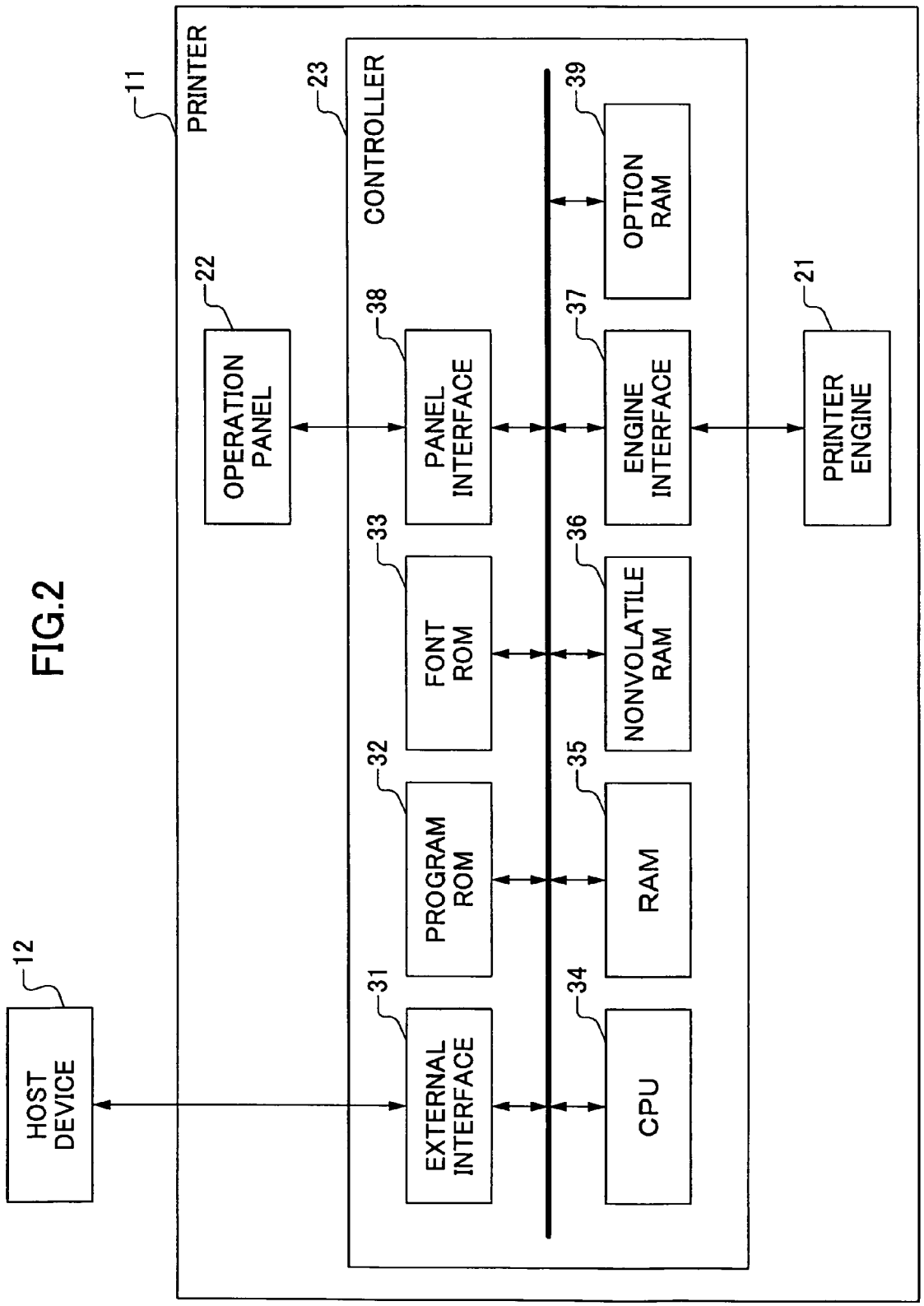
FIG. 2 is a block diagram showing the hardware composition of a laser printer as an image forming device in an embodiment of the invention.

FIG. 2 shows the hardware composition of a laser printer as an image forming device in an embodiment of the invention.

The printer 11 of FIG. 2 is connected to a host device 12 via a network as shown in FIG. 1. The printer 11 includes a printer engine 21 for performing a printout process, and an operation panel 22 for enabling the user to perform operation and setting of the image forming device and for displaying the printer state, etc. to the user. The printer 11 includes a controller 23 which controls these elements 21 and 22.

Specifically, the controller 23 is a controlling mechanism which converts document data received from the host device 12, into image data in accordance with a predetermined control mode and control codes received from the host device 12, and outputs the image data to the printer engine 21. The controller 23 includes an external interface 31, a program storing unit (ROM) 32, a font storing unit (ROM) 33, a control unit (CPU) 34, a temporary storing unit (RAM) 35, a backup memory unit (nonvolatile RAM) 36, an engine interface 37, and a panel interface 38.

The external interface 31 is a transmission/reception unit which receives a command and data from the host device 12, and transmits a status signal to the host device 12.

The program storing unit 32 is a storing unit which stores the program for management of the internal data in the controller 23 and for control of the peripheral modules. The font storing unit 33 is a storing unit which stores the fonts of various kinds used in printing. Each of the program storing unit 32 and the font storing unit 33 is formed by a read-only memory (ROM), for example.

The control unit 34 is a processing unit which processes data received from the host device 12, in accordance with the program stored in the program storing unit 32. The control unit 34 is contained in a central processing unit (CPU), for example.

The temporary storing unit 35 is a storing unit which is used as any of a work memory at a time of the processing by the control unit 34, as a buffer in which the data from the host device 12 is managed on the basis of pages and temporarily stored, and as a bit map memory which stores image data obtained by converting the data stored in the buffer into actual printing patterns. The temporary storing unit 35 is formed by a random access memory (RAM), for example.

The backup memory unit 36 is a storing unit which stores the data to be held even after the printer 11 is powered down. The backup memory unit 36 is formed by a nonvolatile RAM, for example.

The engine interface 37 is a transmission/reception unit which transmits a control signal to the printer engine 21 and receives a status signal from the printer engine 21. The panel interface 38 is a transmission/reception unit which exchanges signals for switching the status, the control mode, the fonts, etc. of the printer 11 with the operation panel 22. The controller 23 may be arranged to further include an option storing unit (RAM) 39. The above-mentioned components of the printer 11 are interconnected by the internal shared bus.

The data received from the host device 12 via the external interface 31 is divided into print data, print control data, and other data by the control unit 34. The print data and the print control data are converted into control codes and the control codes are stored in the temporary storing unit 35.

When a print command and data received from the host device 12 exceeds one page, the control unit 34 converts the control code into image data first, and thereafter gives a print start command to the printer engine 21 via the engine interface 37. In this manner, the printer 11 causes the printer engine 21 to perform printing of the document data received from the host device 12. Based on the image data and the control signal received from the controller 23, the printer engine 21 forms and develops an electrostatic latent image on the photoconductor, supplies a copy sheet from the paper feeding unit, and performs image transferring and fixing so that an image is formed on the copy sheet.

Figure 3:
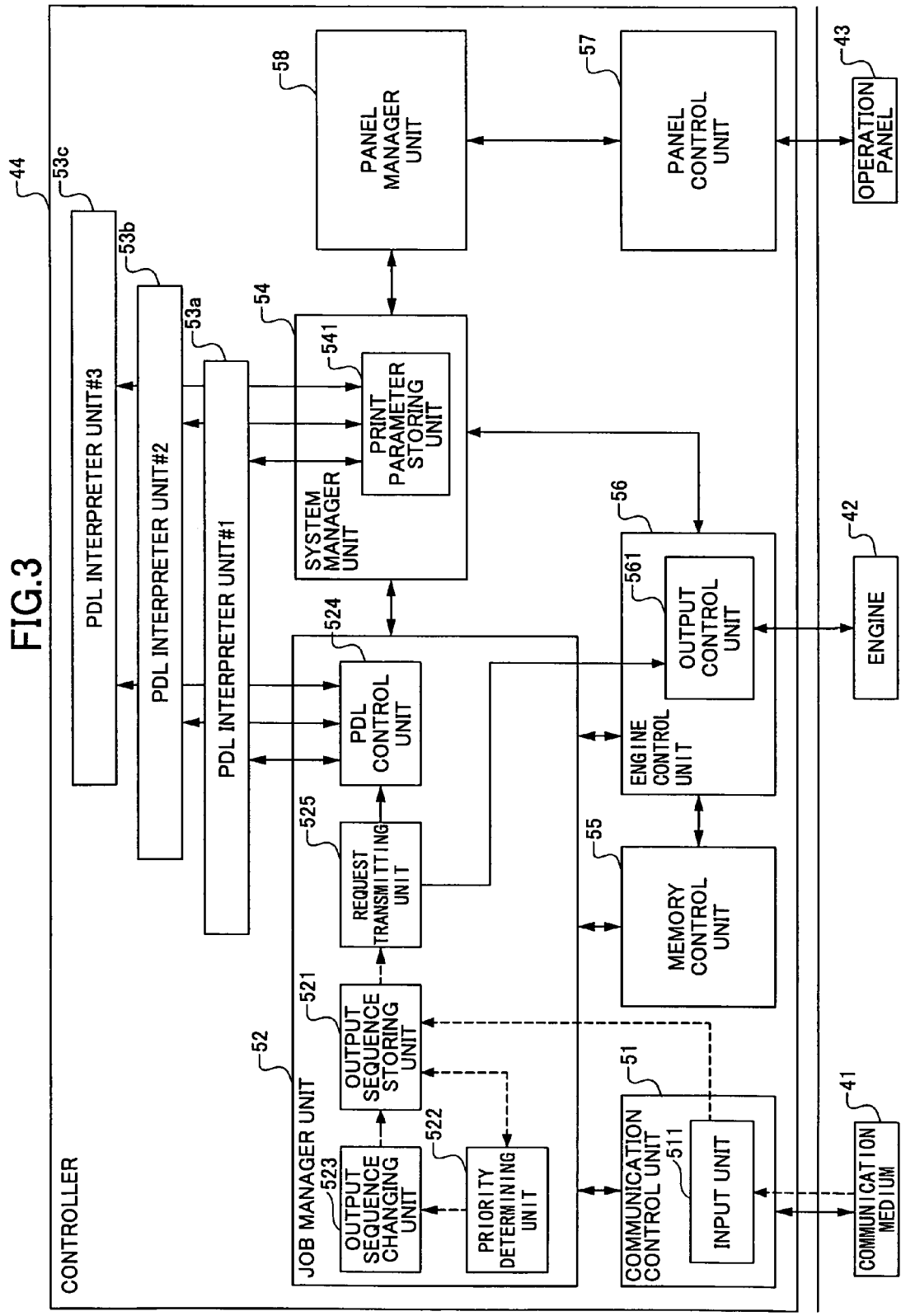
FIG. 3 is a block diagram showing the composition of an image forming device in an embodiment of the invention.

FIG. 3 shows the composition of an image forming device in an embodiment of the invention.

As shown in FIG. 3, the image forming device is provided with the following components: a communication medium 41 for transmitting and receiving data between the host device and the image forming device via the network as shown in FIG. 1; a printer engine 42 for performing a printout process; an operation panel 43 for enabling the user to perform operation and setting of the image forming device and for displaying the state of the image forming device, etc. to the user; and a controller 44 which controls these components 41-43. The communication medium 41, the engine 42, the operation panel 43, and the controller 44 are interconnected by the shared bus.

The controller 44 includes a communication control unit 51, a job manager unit 52, PDL interpreter units 53a, 53b and 53c, a system manager unit 54, a memory control unit 55, an engine control unit 56, a panel control unit 57, and a panel manager unit 58.

The communication control unit 51 includes an input unit 511, and receives the data sent from the host device via the communication medium 41 by this input unit. The communication control unit 51 interprets the communications protocol and the printing protocol, and transmits parameters obtained as a result of the interpretation, such as a communication port number and a printer name, as well as the PDL data received from the host device, to the job manager unit 52.

The job manager unit 52 is a control unit which determines a priority based on the priority determining parameters received from the communication control unit 51, changes the process sequence of jobs in accordance with the determined priority, and controls each of the PDL interpreter units 53a, 53b and 53c according to changes in the process sequence. The job manager unit 52 includes an output sequence storing unit 521, a priority determining unit 522, an output sequence changing unit 523, a PDL control unit 524, and a request transmitting unit 525.

The output sequence storing unit 521 is a storing unit which stores an output sequence according to the sequence of reception of the data items by the input unit 511. The priority determining unit 522 is a unit which determines a priority based on the priority determining parameters received from the communication control unit 51.

The output sequence changing unit 523 is a unit which changes the output sequence stored in the output sequence storing unit 521, in accordance with the priority determined by the priority determining unit 522. The PDL control unit 524 is a unit which controls each of the PDL interpreter units 53a, 53b and 53c in accordance with the output sequence stored in the output sequence storing unit 521.

The request transmitting unit 525 is a unit which transmits a start request of a job or a stop request of a job to each of the PDL control unit 524 and the engine control unit 56, so that a job with a high priority is preferentially processed according to the output sequence stored in the output sequence storing unit 521.

When data is received from the communication control unit 51, the job manager unit 52 temporarily stores the output sequence of the data received from the communication control unit 51, in the output sequence storing unit 521 according to the sequence of reception of the data items by the input unit 511.

Then, the priority determining unit 522 determines the priority of outputting the data by a printing request from the host device, and the output sequence changing unit 523 changes the output sequence stored in the output sequence storing unit 521, in accordance with the determined priority.

When the output sequence stored in the output sequence storing unit 521 is changed, the PDL control unit 524 controls each of the PDL interpreter units 53a, 53b and 54c in accordance with the changed output sequence.

For example, suppose that, as a result of changing the output sequence, a priority of outputting PDL data newly received from the communication control unit 51 is higher than that of the in-process data currently processed by the first PDL interpreter unit 53a. In this case, the request transmitting unit 525 transmits to the PDL control unit 524 a process stop request for stopping the in-progress PDL interpretation process by the first PDL interpreter unit 53a, and a process start request for causing the second PDL interpreter unit 53b to perform preferentially the PDL interpretation process of the new PDL data. In response, the PDL control unit 524 suspends the in-progress PDL interpretation process by the first PDL interpreter unit 53a and causes the second PDL interpreter unit 53b to start performing the PDL interpretation process of the new PDL data.

Then, the PDL control unit 524 controls the first PDL interpreter unit 53a to restart the suspended process after the PDL interpretation process by the second PDL interpreter unit 53b is completed.

The PDL interpreter units 53a, 53b and 53c interpret the PDL data received from the communication control unit 51 via the job manager unit 52, and return the result of the interpretation to the job manager unit 52 by converting the interpretation result into the image data. The number of PDL interpreter units provided in the controller 44 varies depending on the number of levels which can be taken by the priority. Namely, in this embodiment, the level of priority is taken as one of three steps: 0, 1, and 2, and the number of the PDL interpreter units provided in the controller 44 is set to 3. Suppose that the priority becomes higher as the level number increases.

The system manager unit 54 controls stopping and restarting of each of the PDL interpreter units 53a, 53b and 53c in accordance with the request from the job manager unit 52. The system manager unit 54 includes a print parameter storing unit 541 which stores the print parameters corresponding to each of the PDL interpreter units 53a, 53b and 53c.

The memory control unit 55 stores the image data which is output from the PDL interpreter units 53a, 53b and 53c via the job manager unit 52. The engine control unit 56 includes an output control unit 561 which controls the engine 42 to perform printing of the image data stored in the memory control unit 55, in accordance with the output sequence stored in the output sequence storing unit 521 of the job manager unit 52.

The panel control unit 57 controls the operation panel 43 in accordance with the instructions of the panel manager unit 58. The panel manager unit 58 performs the displaying of a setting menu, the displaying of an engine state, etc. in the operation panel 43 through the panel control unit 57.

A description will be given of the operation of the image forming device of this embodiment with reference to FIG. 1 through FIG. 3.

Embodiment 1

FIG. 4A and FIG. 4B show an example of data configuration before and after an output sequence of the output sequence storing unit 521 is changed in an embodiment (embodiment 1) shown in FIG. 3.

The output sequence storing unit 521 includes a table for managing the state of data being processed as shown in FIG. 4A and FIG. 4B. In the table of FIG. 4A and FIG. 4B, the state of a data item for each column of the table is expressed. Each column of the table includes, for example: an identifier (ID) for identifying the data item; a communication port for indicating a Raw port number of the data item received from the communication control unit 51; a priority of outputting the data item determined by the priority determining unit 522; a state of PDL interpretation process performed by any of the PDL interpreter units 53a, 53b and 53c; and the number (identifier) of the PDL interpreter unit to which the data item is assigned for performing the PDL interpretation process.

Suppose that the output sequence in the table of FIG. 4A and FIG. 4B is stored in accordance with the sequence of data items arrayed in the table, and the priority is represented by the number ranging from 0 to (N−1) (where N denotes the number of PDL interpreter units) and the priority becomes higher as the number increases.

In the table of FIG. 4A, the data items identified by the identifier ID=1, 2, 3 . . . are stored in sequence of the identifier ID=1, 2, 3 . . . .

The data item corresponding to ID=1 has the priority=1 and its PDL interpretation process is performed by the first PDL interpreter unit 53a. The data item corresponding to ID=2 has the priority=0 and it is in the waiting state for performing its PDL interpretation process. The data item corresponding to ID=3 has the priority=2 and it is in the waiting state for performing its PDL interpretation process.

When the output sequence stored in the table in accordance with the sequence of arrangement of the data items as shown in FIG. 4A is changed by the output sequence changing unit 523 according to their priorities, the data items are rearranged in the table of the output sequence storing unit 521 as shown in FIG. 4B.

Specifically, after the change of the output sequence, the data items identified by the identifier ID=1, 2, 3 . . . are rearranged and stored in a sequence of the identifier ID=3, 1, 2 . . . as shown in FIG. 4B. As for the data item corresponding to ID=3 and having the priority=2, its PDL interpretation process is performed by the second PDL interpreter unit 53b.

As for the data item corresponding to ID=1 and having the priority=1, the process by the first PDL interpreter unit 53a which was performed before the change of the output sequence is suspended.

And the data item corresponding to ID=2 and having the priority=0 is still in the waiting state, which is the same as before the change of the output sequence.

Figure 5:
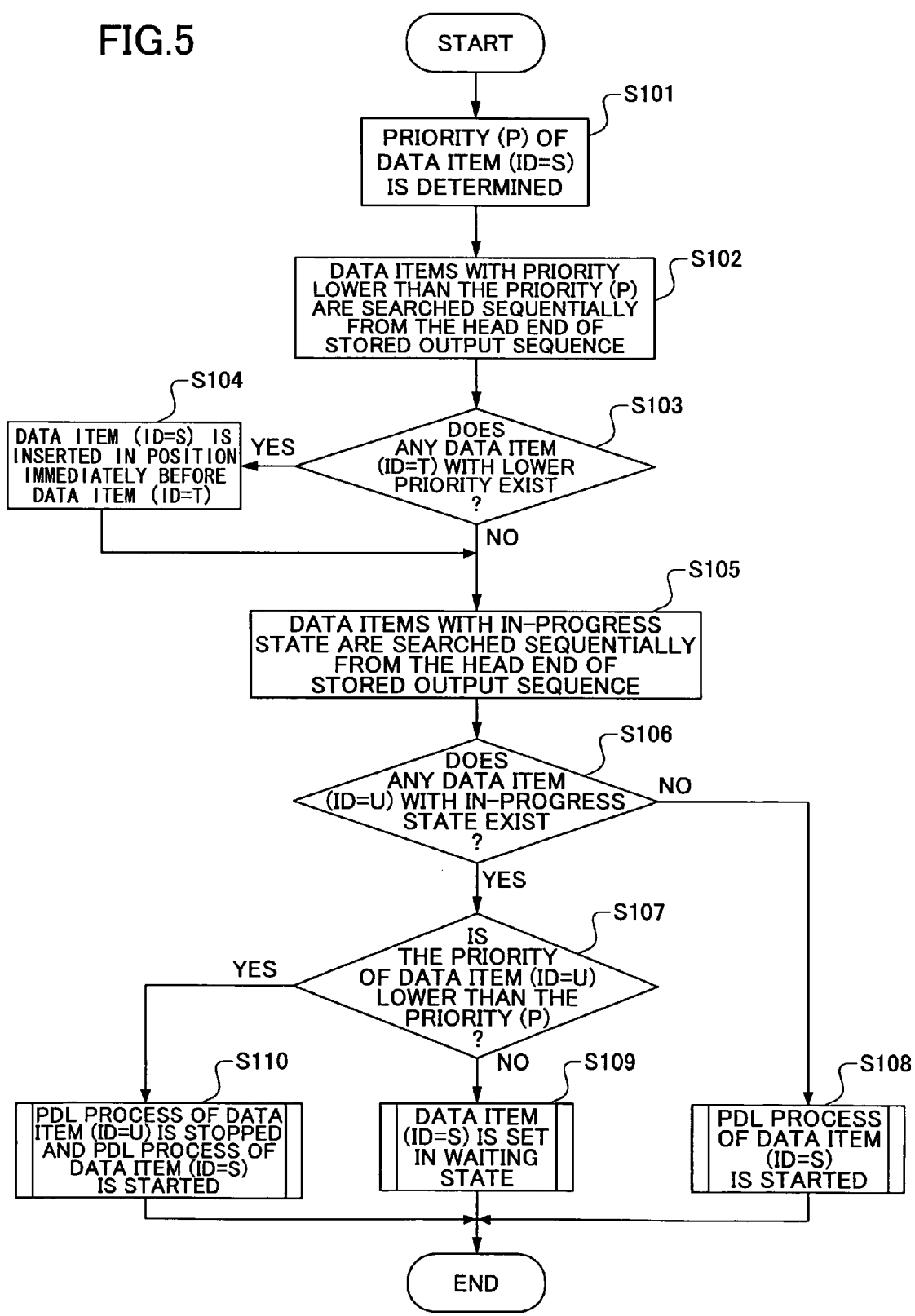
FIG. 5 is a flowchart for explaining the process of changing the output sequence in the image forming device of embodiment 1.

Changing the output sequence as mentioned above is carried out by the output sequence changing unit 523 and the PDL control unit 524. FIG. 5 is a flowchart for explaining the process of changing the output sequence in the image forming device of this embodiment.

As shown in FIG. 5, if a new data item from the communication control unit 51 is transmitted to the job manager unit 52, ID (=S) is given to the transmitted data item and the output sequence storing unit 521 stores the information concerning the data item, together with the ID given thereto, in the table format as shown in FIG. 4A. At this time, the information concerning the data item corresponding to ID=S is stored at the tail end of the output sequence storing unit 521, and its priority has not been determined yet.

After the information is stored in the output sequence storing unit 521, in step S101, the priority determining unit 522 determines a priority P of the data item, newly received from a priority determination table, by using the priority determining parameters received from the communication control unit 51 as an input. The details of the priority determination table will be described later.

After the determination of the priority P, in step S102, the output sequence changing unit 523 searches data items which have a priority lower than the priority P determined at step S101, sequentially from the head end of the output sequence storing unit 521.

When a data item having a priority lower than the priority P is found in step S103, the control progresses to step S104 (ID of this data item is set to T).

In step S104, the output sequence changing unit 523 deletes the information concerning the data item corresponding to ID=S from the tail end of the output sequence storing unit 521, and inserts the same immediately before the information concerning the data item corresponding to ID=T.

When the information concerning the data item corresponding to ID=T is stored at the head end of the output sequence storing unit 521 at this time, the request transmitting unit 525 requests the engine control unit 56 to suspend the output process of the data item corresponding to ID=T. Then, the control progresses to step S105.

When the data which has a priority lower than priority P is not found in step S103, the control progresses to step S105 without performing step S104.

In step S105, the request transmitting unit 525 searches the data items whose state is "in progress" sequentially from the head end of the output sequence storing unit 521. That is, the data item for which the PDL interpretation process is performed by any of the PDL interpreter units is searched.

When the data item in the state "in progress" is found in step S106, the control progresses to step S107 (ID of this data item is set to U).

In step S107, the request transmitting unit 525 judges whether the priority of the data is lower than the priority P determined at step S101.

When the priority is higher than P, the control progresses to step S109. When the priority is lower than P, the control progresses to step S110.

In step S109, the request transmitting unit 525 suspends the newly input data item corresponding to ID=S. That is, the state of this data item is set to "waiting for process".

On the other hand, in step S110, the request transmitting unit 525 transmits a stop request to the PDL control unit 524, for suspending the in-progress PDL interpretation process of the data item corresponding to ID=U, and transmits a PDL interpreting process start request for starting the PDL interpretation process of the newly input data item corresponding to ID=S.

In response, the PDL control unit 524 suspends the in-progress PDL interpretation process of the data item corresponding to ID=U by the PDL interpreter unit 53a or 53b. The PDL interpreter unit 53b or 53c is controlled to perform the PDL interpretation process of the newly input data item corresponding to ID=S.

At this time, the state of the data item corresponding to ID=U is changed from "in progress" to "during stop", and the state of the data item corresponding to ID=S becomes "in progress".

When a data item in the state "in progress" is not found in step S106, the control progresses to step S108. In step S108, the request transmitting unit 525 transmits a PDL interpreting process start request for starting the PDL interpretation process of the newly input data item corresponding to ID=S, to the PDL control unit 524.

In response, the PDL control unit 524 controls the PDL interpreter unit 53a to perform the PDL interpretation process of the newly input data item corresponding to ID=S. At this time, the state of this data item becomes "in progress".

Next, the operation of the PDL control unit 524 after the in-progress PDL interpretation process of a certain data is completed will be explained with reference to FIG. 6.

Figure 6:
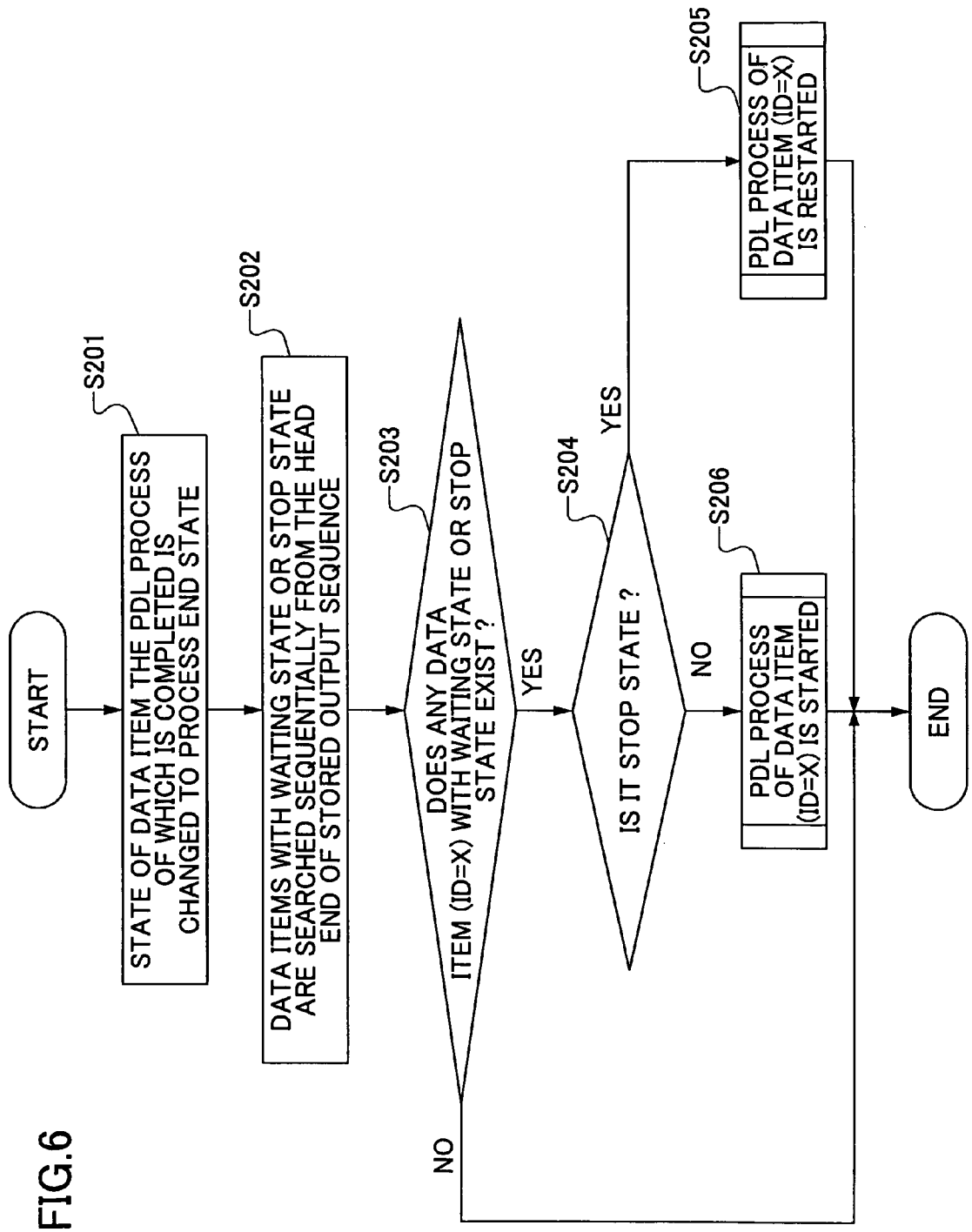
FIG. 6 is a flowchart for explaining the operation of a job manager unit in the image forming device of embodiment 1 after a PDL interpretation process is completed.

FIG. 6 is a flowchart for explaining the operation of the job manager unit in the image forming device of embodiment 1 after a PDL interpretation process is completed.

After the in-progress PDL interpretation process of certain data is completed, in step S201, the PDL control unit 524 changes the state of the data for which the PDL interpretation process has ended to "process end".

Next, in step S202, the request transmitting unit 525 sequentially searches the data whose state is "process waiting" or "during stop" from the head end of the output sequence storing unit 521.

When the data whose state has become "process waiting" or "during stop" is found in step S203, the control progresses to step S204 (ID of this data item is set to X).

In step S204, the request transmitting unit 525 determines whether the state of the data is "during stop". When the state of the data item corresponding to ID=X is "during stop", the control progresses to step S205.

In step S205, the request transmitting unit 525 transmits a restart request of PDL interpretation to the PDL control unit 524, so that execution of the PDL interpretation process of the data item corresponding to ID=X by the PDL interpreter unit 53a or 53b may be restarted.

On the other hand, when the state of the data item corresponding to ID=X is not "during stop" in step S204, i.e., when it is in a "waiting" state, the control progresses to step S206.

In step S206, the request transmitting unit 525 transmits, to the PDL control unit 524, a PDL interpretation start request for starting the PDL interpretation process of the data item corresponding to ID=X by the PDL interpreter unit 53a or 53b.

When the data whose state is "process waiting" or "during stop" is not found in step S203, the job manager unit 52 terminates the process.

FIG. 7 is a sequence diagram for explaining the operation of respective modules in the image forming device according to this embodiment when the output sequence is changed according to the input data with a high priority.

First, in step S301, data from the communication control unit 51 is input to the job manager unit 52. At this time, the output process of the first job by the engine 42 is performed by the engine control unit 56, and the PDL control unit 524 performs the PDL interpretation process of the second job by the first PDL interpreter unit 53a.

The priority of the third job concerning the outputting of the input data is higher than each priority of the first job and the second job. The job manager unit 52 performs, at the timing of data input, the process of changing the output sequence mentioned above with reference to FIG. 5.

Thereby, in the job manager unit 52, the output sequence stored in the output sequence storing unit 521 is changed by the output sequence changing unit 523.

Next, the job manager unit 52 transmits a PDL interpreting process stop request to the first PDL interpreter unit 53a, and makes the in-progress PDL interpretation process of the second job suspend in step S302.

Successively or simultaneously with step S302, the job manager unit 52 transmits a printing stop request to the engine control unit 56, and makes the engine 46 stop the in-progress output process of the first job in step S303.

After the PDL interpretation process and the output process are stopped, the job manager unit 52 transmits a PDL interpreting process start request to the second PDL interpreter unit 53b, and makes the PDL interpretation process of the third job concerning the data input by the communication control unit 51 start in step S304.

In step S305, the job manager unit 52 transmits a printing start request to the engine control unit 56 so that the image data obtained as a result of the PDL interpretation process of the third job performed by the second PDL interpreter unit 53b may be printed. In response, the engine control unit 56 starts the output process of the third job by the engine 42.

After the PDL interpretation process of the third job by the second PDL interpreter unit 53b is completed, in step S306, the second PDL interpreter unit 53b transmits the notice of the end of the PDL interpretation to the job manager unit 52.

Accordingly, the job manager unit 52 recognizes that the process by the second PDL interpreter unit 53b has ended.

In step S307, the restart request of PDL process is transmitted to the first PDL interpreter unit 53a, and the PDL interpretation process of the second job stopped in step S302 is caused to restart.

After the output process of the third job by the engine 42 is completed, in step S308, the engine control unit 56 transmits the notice of the end of printing to the job manager unit 52.

Accordingly, the job manager unit 52 recognizes that printing of data with a high priority at the head end of the output sequence was completed, and cancels the head-end data stored in the output sequence storing unit 521.

Next, the job manager unit 52 transmits a printing restart request to the engine control unit 56, and makes the output process of the first job stopped in step S303 restart in step S309.

As mentioned above, the priority determining unit 522 of FIG. 3 determines the priority of the data newly received from the priority determination table by using the priority determining parameters received from the communication control unit 51.

A description will be given of the priority determining parameters with reference to FIG. 8A and FIG. 8B.

FIG. 8A shows an example of the priority determination table in which a priority is determined according to the Raw port number. The priority determination table of FIG. 8A shows the relationship between the Raw port number and the priority. The priority becomes higher in sequence of the 9100 port, the 9101 port, and the 9102 port.

FIG. 8B shows an example of the priority determination table in which a priority is determined according to the communication protocol. The priority determination table of FIG. 8B shows the relationship between the communications protocol and the priority. The priority for Raw port printing is the lowest, and the priority for Apple Talk printing is the highest. The priority for LPR (Line PRinter daemon protocol) printing and the priority for IPP (Internet Printing Protocol) printing are the same, and it is in the middle level between the priority for Raw port printing and the priority for Apple Talk printing.

FIG. 8C shows an example of the priority determination table in which a priority is determined according to a printer name. The priority determination table of FIG. 8C shows the relationship between the printer name which is specified by a LPR protocol and the priority. The priority becomes higher in sequence of "lp1", "lp2", "lp3", and "lp4".

In this manner, a priority can be arbitrarily set up according to the communication port, the communications protocol, the printer name, etc. Management of the priority and these parameters for determining the priority using the above-mentioned table in any of FIGS. 8A to 8C would facilitate the changing of the priority.

Alternatively, the priority may be determined according to the priority described in the data received from the communication control unit 51.

As mentioned above, a corresponding number of PDL interpreter units for the number of priority levels that can be specified are provided in the image forming device of embodiment 1, and it is possible to process a following job with a high priority earlier, without canceling a previous job during PDL expansion.

More specifically, even if image expansion of the data input previously is in progress, the image expansion is suspended. By allocating the CPU and the memory in the image forming device to the image expansion of the previously input data with a higher printing priority, the interruption process for the printing may be performed.

The above-mentioned embodiment may be arranged so that, after the image expansion of the subsequently input data is completed, the image expansion of the previously input data in the stopped state is restarted automatically.

Embodiment 2

When the PDL interpreter unit contained in the image forming device does not support the interruption process, it is impossible to suspend the in-progress PDL interpretation process.

To eliminate the problem, the image forming device of a second embodiment (embodiment 2) is arranged so that it is determined whether the PDL interpreter unit supports the interruption process. When the interruption process is not supported, after the in-progress PDL interpretation process of a preceding job is completed, the output process of a following job with a high priority may be performed before the output process of the preceding job is started.

FIG. 9A, FIG. 9B, FIG. 9C and FIG. 9D show an example of data configuration before and after the output sequence of the output sequence storing unit 521 of FIG. 3 is changed.

The output sequence storing unit 521 is provided with a table which manages the state of data as shown in any of FIG. 9A through FIG. 9D. The state of each data item is expressed for each column of the table. Each column of the table includes, for example: an ID (identifier) for identifying the data item; a priority of outputting the data item determined by the priority determining unit 522; a state of the PDL interpretation process by any of the PDL interpreter units 53*a*, 53*b* and 53*c*; the number (identifier) of the PDL interpreter unit to which the data item is assigned for performing the PDL interpretation process; and a state of the printout process by the engine control unit 56.

The definition of output sequence and priority in embodiment 2 is the same as that in the embodiment 1 of FIG. 4A and FIG. 4B.

FIG. 9A shows an example of a data configuration of the output sequence storing unit 521 before data is input. In the table of FIG. 9A, the data items identified by the identifier ID=1, 2, . . . are stored in sequence of the identifier ID=1, 2, . . . . In embodiment 2, the number of the ID is sequentially assigned in the sequence of reception of the input data items. Each of the data items corresponding to ID=1 and ID=2 has the priority=1. When the priority is the same, the data items are processed in accordance with the input sequence.

As for the data item corresponding to ID=1, the output process by the engine 42 is performed by the engine control unit 56 and the PDL interpretation process is performed by the first PDL interpreter unit 53*a*.

On the other hand, the data item corresponding to ID=2 is in the waiting state concerning either of the PDL interpretation process and the output process.

FIG. 9B shows an example of data configuration of the output sequence storing unit 521 immediately after a new data item is input.

In the table of FIG. 9B, ID=3 is assigned for the newly input data item and it is stored in position following the data item corresponding to ID=2. The new data item for which ID=3 is assigned has the priority=2 which is higher than that of each of the previously input data items corresponding to ID=1 and ID=2.

In embodiment 1 mentioned above with reference to FIG. 4A and FIG. 4B, even when the PDL interpretation process of the previous input data is performed, if the priority of the newly input data is higher than the previously input data, then the in-progress process is suspended and the output sequence is changed so that the newly input data with a high priority may be output preferentially. However, when the PDL interpreter unit does not support the interruption process, the output sequence cannot be changed.

FIG. 9C shows an example of a data configuration of the output sequence storing unit 521 when the in-progress PDL interpretation process is in the waiting state at the time of reception of the input data. In embodiment 2, when the PDL interpreter unit does not support the interruption process, the output sequence can be changed in accordance with the priority assigned to the data, after the in-progress process by the PDL interpreter unit is completed.

In FIG. 9C, the data configuration immediately after the in-progress PDL interpretation process of the data item corresponding to ID=1 at the time of reception of the input data item corresponding to ID=3 is completed is illustrated. The PDL process state of the data item corresponding to ID=1 is set to "process end". The PDL process state of each of the data items corresponding to ID=2 and ID=3 is still set to "waiting".

Thereafter, or at the same time when the previous PDL interpretation process is completed, the data configuration of the output sequence storing unit 521 is rewritten by the output sequence changing unit 523 as shown in FIG. 9D. More specifically, after the change of the output sequence, the data items identified by the identifier ID=1, 2, 3 . . . are rearranged according to their priorities and stored in sequence of the identifier ID=3, 1, 2 . . . .

Because the data item corresponding to ID=3 has a priority higher than that of the data item corresponding to ID=2, which was in the "waiting" state, higher priority is given to the data item corresponding to ID=3 and its PDL interpretation process is performed by the second PDL interpreter unit 53*b* preferentially.

Because the data item corresponding to ID=3 has a priority higher than the data item corresponding to ID=1 which was "during printing", higher priority is given to the data item corresponding to ID=3 and its output process by the engine 42 is performed by the engine control unit 56 preferentially. Therefore, the in-progress output process of the data item corresponding to ID=1 which was performed before the change of the output sequence was suspended. Finally, the data item corresponding to ID=2 is in the waiting state, which is the same state this data item was in before the output sequence was changed.

FIG. 10 is a flowchart for explaining the operation of the job process in the image forming device of embodiment 2.

If new data from the communication control unit 51 is transmitted to the job manager unit 52, its priority is determined as in the embodiment 1 (step S101 of FIG. 5).

When the determined priority is higher than that of the job of each of the in-progress PDL interpretation process and the output process, in step S401, the PDL control unit 524 determines whether the PDL interpreter unit which is performing the PDL interpretation process supports the interruption process, or whether the PDL interpreter unit is capable of being stopped.

When the PDL interpreter unit can be stopped, the PDL control unit 524 causes the in-progress PDL interpretation process to be suspended in step S402. Then, the control progresses to step S404.

On the other hand, when the PDL interpreter unit cannot be stopped, in step S403, the PDL control unit 524 is held in a waiting state until the in-progress PDL interpretation process is completed.

After the PDL interpretation process is stopped (S402) or completed (S403), the job manager unit 52 causes the request transmitting unit 525 to transmit a printing stop request to the engine control unit 56, and makes the in-progress output process by the engine 42 suspend in step S404.

Next, in step S405, the job manager unit 52 causes the request transmitting unit 525 to transmit a PDL interpreting process start request to a PDL interpreter unit other than the PDL interpreter unit which was performing the PDL interpretation process previously, so that the PDL interpretation process of the data with a high priority input from the communication control unit 51 is caused to start.

Moreover, the job manager unit 52 causes the request transmitting unit 525 to transmit a printing start request to the engine control unit 56, so that the image data obtained as a result of this PDL interpretation process may be printed. In response, the engine control unit 56 starts the output process by the engine 42.

FIG. 11 is a sequence diagram for explaining the operation of respective modules in the image forming device of embodiment 2 when a PDL interpreter unit does not support the interruption process.

First, in step S501, data from the communication control unit 51 is input to the job manager unit 52. At this time, the output process of the first job is performed by the engine control unit 56 using the engine 42, and the PDL interpretation process of the second job is performed by the PDL control unit 524 using the first PDL interpreter unit 53*a*.

The priority of the third job concerning the outputting of the input data is higher than each priority of the first job and the second job.

The job manager unit 52 until the in-progress PDL interpretation process of the second job is completed by the first PDL interpreter unit 53*a* if it is detected that the first PDL interpreter unit 53*a* does not support the interruption process by the PDL control unit 524, and the starting of the PDL interpretation process of the third job is made to wait.

Then, after the PDL interpretation process of the second job by the first PDL interpreter unit 52*a* is completed, in step S502, the first PDL interpreter unit 53*a* transmits the notice of the end of PDL interpretation to the job manager unit 52. In response to this notice, in step S503, the job manager unit 52 causes the output sequence changing unit 523 to change the output sequence stored in the output sequence storing unit 521 so that the third job may be output preferentially over other jobs. A printing stop request is transmitted to the engine control unit 56, and the engine 46 is made to stop the in-progress output process of the first job.

After the output process stops, the job manager unit 52 transmits a PDL interpreting process start request to the second PDL interpreter unit 53*b*, and makes the PDL interpretation process of the third job concerning the data input by the communication control unit 51 start in step S504.

In step S505, the job manager unit 52 transmits a printing start request to the engine control unit 56 so that the image data obtained as a result of the PDL interpretation process performed by the second PDL interpreter unit 53*b* to the third job may be printed. In response, the engine control unit 56 starts the output process of the third job by the engine 42.

After the PDL interpretation process of the third job by the second PDL interpreter unit 53*b* is completed, in step S506, the second PDL interpreter unit 53*b* transmits the notice of the end of PDL interpretation to the job manager unit 52.

Accordingly, the job manager unit 52 can recognize that the process performed by the second PDL interpreter unit 53*b* was completed.

After the output process of the third job by the engine 42 is completed, in step S507, the engine control unit 56 transmits the notice of the end of printing to the job manager unit 52.

Accordingly, the job manager unit 52 recognizes that printing data with a high priority at the head end of the output sequence was completed, and cancels the head-end data stored in the output sequence storing unit 521.

Next, the job manager unit 52 transmits a printing restart request to the engine control unit 56, and makes the output process of the first job stopped in previous step S503 restart in step S508.

It is possible for the image forming device of embodiment 2 to detect the support situation of a PDL interpreter unit beforehand, and it is therefore possible to avoid occurrences of useless events.

Figures 12A, 12B:
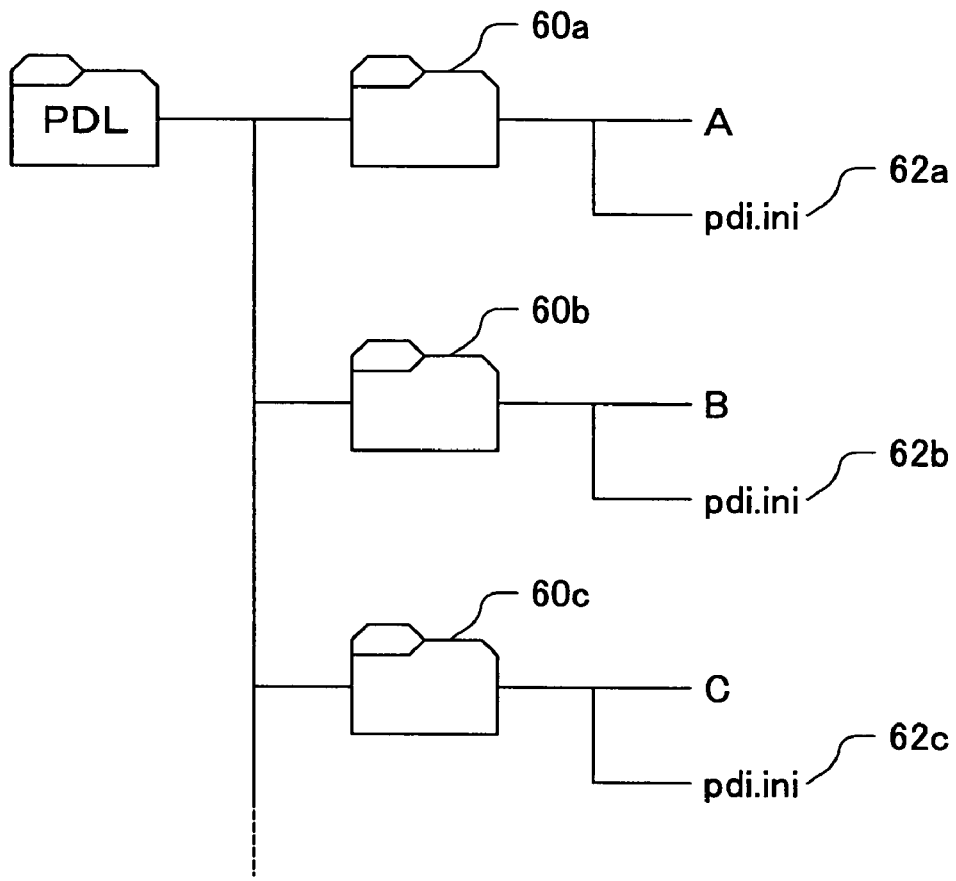
FIG. 12A and FIG. 12B are diagrams showing an example of directory structure of a PDL interpreter unit and an example of a configuration file in the image forming device of embodiment 2.

FIG. 12A and FIG. 12B show an example of the directory structure of a PDL interpreter unit and an example of a configuration file in the image forming device of embodiment 2.

FIG. 12A shows an example of the directory structure of a PDL interpreter unit. A PDL interpreter unit includes one or plural PDL interpreter units, and respective folders are individually provided for the PDL interpreter units. For example, the first, second, and third folders shown in FIG. 12A correspond to the first, second, and third PDL interpreter units 53*a*, 53*b* and 53*c* shown in FIG. 3, respectively. The configuration files 62*a*, 62*b*, and 62*c* named "pdl.ini" are stored in the folders 53*a*, 53*b* and 53*c*, respectively.

FIG. 12B shows an example of a description of a configuration file. The configuration file of FIG. 12B contains the items which indicate a version 620 of the PDL interpreter unit, a PDL name 622, and an interruption process support parameter 624. For example, the interruption process support parameter 624 may be described only when the PDL interpreter unit is capable of being stopped, and when it is not capable of being stopped, the interruption process support parameter 624 itself is not described in the configuration file.

As mentioned above, the image forming device of embodiment 2 determines whether the PDL interpreter unit supports the interruption process, and when it is not supported, the output sequence is controlled so that a job with a high priority may be processed after the in-progress PDL interpretation process by the PDL interpreter unit is completed. It is possible to process a following job with a high priority first even when the PDL interpreter unit does not support the interruption process.

Embodiment 3

Although there are various printing conditions, there is a known method of performing a printout process while occupying a specific resource of the image forming device during a job execution, such as a staple function. For example, when the staple function is used, the staple tray of the image forming device is used continuously during execution of the job.

In the above-mentioned embodiments 1 and 2, when the in-progress output process of a job by the engine 42 exists and another job with a priority of outputting higher than that of the active job is input, the in-progress process is stopped and the higher priority is given to the output process of the input job. However, in this case, if the staple function is set up for the in-progress output process of the active job by the engine 42, insertion of the input job with a high priority may cause a problem that the printed result of the in-progress output process of the active job and the printed result of the output process of the input job are secured with a staple. That is, when the specific resource is currently used by the in-progress process of the active job, insertion of an input job which will use the same specific resource may cause an undesirable printing result.

To eliminate the problem, the image forming device of this embodiment is arranged so that, when a job with a high priority which uses the same resource as the specific resource used by which the active job is input, the in-progress output process is not suspended immediately after the stop or end of the PDL interpretation process and the output process of the job with a high priority will be performed after the end of the output process of the active job.

Figure 13:
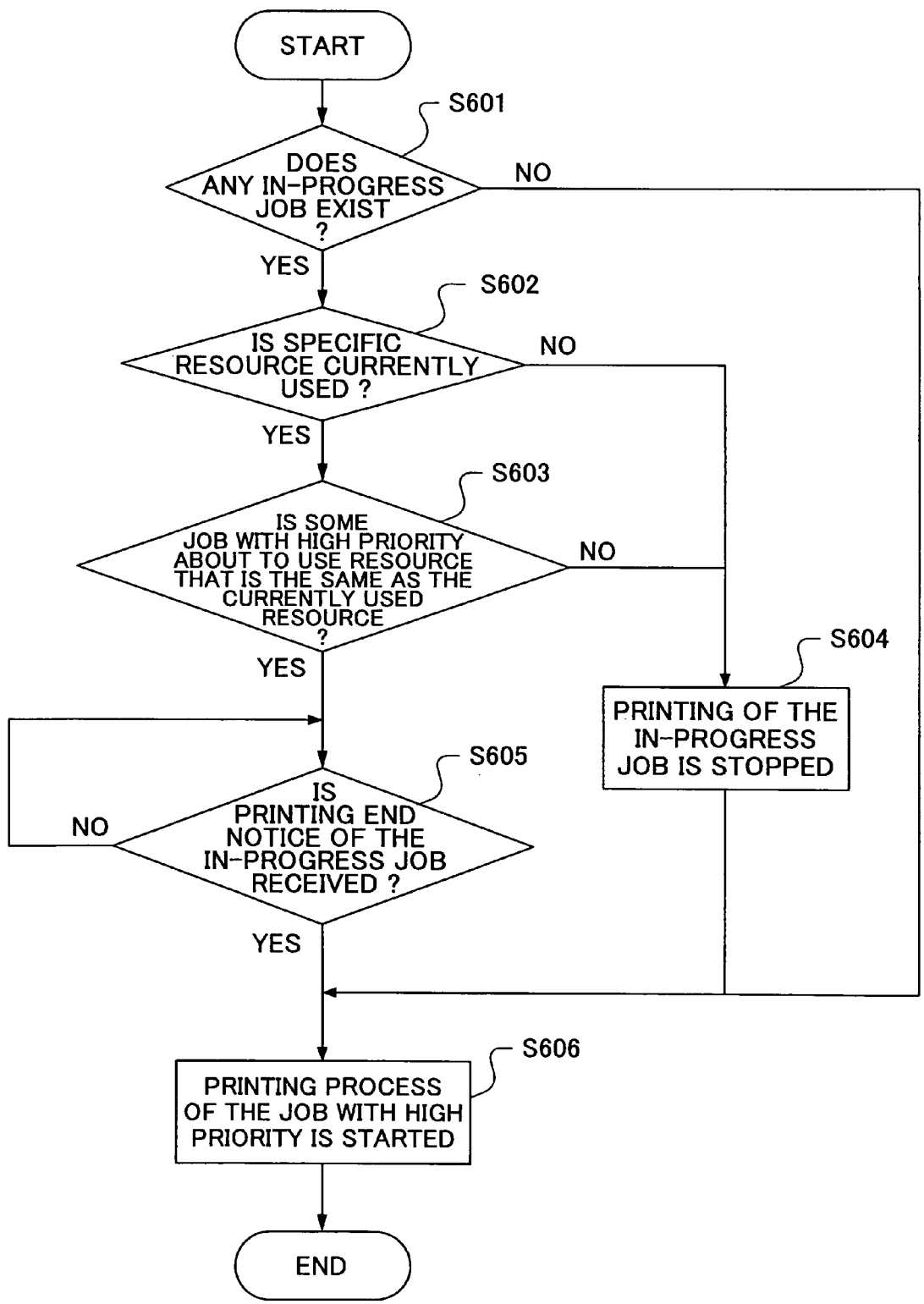
FIG. 13 is a flowchart for explaining the operation of a job process of the image forming device of a third embodiment of the invention (embodiment 3).

FIG. 13 is a flowchart for explaining the operation of the job process of the image forming device of embodiment 3.

If new data from the communication control unit 51 is transmitted to the job manager unit 52, the job manager unit 52 determines the new data's priority as in the image forming device of embodiment 1 (step S101 of FIG. 5).

When the determined priority is higher than that of the object job of each of the in-progress PDL interpretation process and output process, the in-progress PDL interpretation process by the PDL interpreter unit is suspended (in the embodiment 1) or ended (in the embodiment 2) at the time of reception of the data transmitted.

After the PDL interpretation process is stopped or completed, in step S601, the job manager unit 52 determines whether there is any job for which the output process is currently performed by the engine 42, based on the data (as shown in FIG. 9) stored in the output sequence storing unit 521. If no job for the output process is active, the control progresses to step S606.

On the other hand, when the output process of a job is currently performed by the engine 42, in step S602, the job manager unit 52 determines whether a specific resource of the image forming device is currently used by the in-progress output process in the engine 42, based on the data stored in the output sequence storing unit 521.

If neither of the resources is currently used, the control progresses to step S604. In step S604, the job manager unit 52 causes the output sequence changing unit 523 to change the output sequence stored in the output sequence storing unit 521 so that the input data whose priority is higher than that of other in-progress jobs may be processed preferentially, and also causes the request transmitting unit 525 to transmit a printing stop request to the engine control unit 56, so that the engine 42 is caused to stop the in-progress output process.

On the other hand, when the specific resource is currently used, in step S603, the job manager unit 52 checks the printing conditions contained in the input data by using the communication control 51. That is, the job manager unit 52 determines whether the resource which is the same as the resource currently used by the in-progress output process is used by the job with a high priority.

If the same resource is not used, the control progresses to step S604.

On the other hand, when the job with a high priority uses the same resource as the resource currently used by the in-progress output process, in step S605, the job manager unit 52 causes the output sequence changing unit 523 to change the output sequence stored in the output sequence storing unit 521 so that the input data with a high priority may be processed preferentially after the in-progress output process is completed, and the job manager unit 52 is held in a waiting state until the notice of the end of the in-progress output process by the engine 42 is received from the engine control unit 56.

After the in-progress output process is stopped or completed, in step S606, the job manager unit 52 causes the request transmitting unit 525 to transmit a PDL interpreting process start request to a PDL interpreter unit other than the PDL interpreter unit which was performing the PDL interpretation process previously through the PDL control unit 524, so that the PDL interpretation process of the data with a high priority input from the communication control unit 51 is caused to start.

Moreover, the job manager unit 52 causes the request transmitting unit 525 to transmit a printing start request to the engine control unit 56, so that the image data obtained as a result of the PDL interpretation process may be printed. In response, the engine control unit 56 starts the output process by the engine 42.

Alternatively, rather than performing the PDL interpretation process and the output process of data with a high priority in parallel after the end of the previous in-progress output process, the PDL interpretation process of the data with a high priority may be performed in advance, immediately after a stop or end of the previous in-progress PDL interpretation process, in order to improve the process efficiency of the image forming device.

Figure 14:
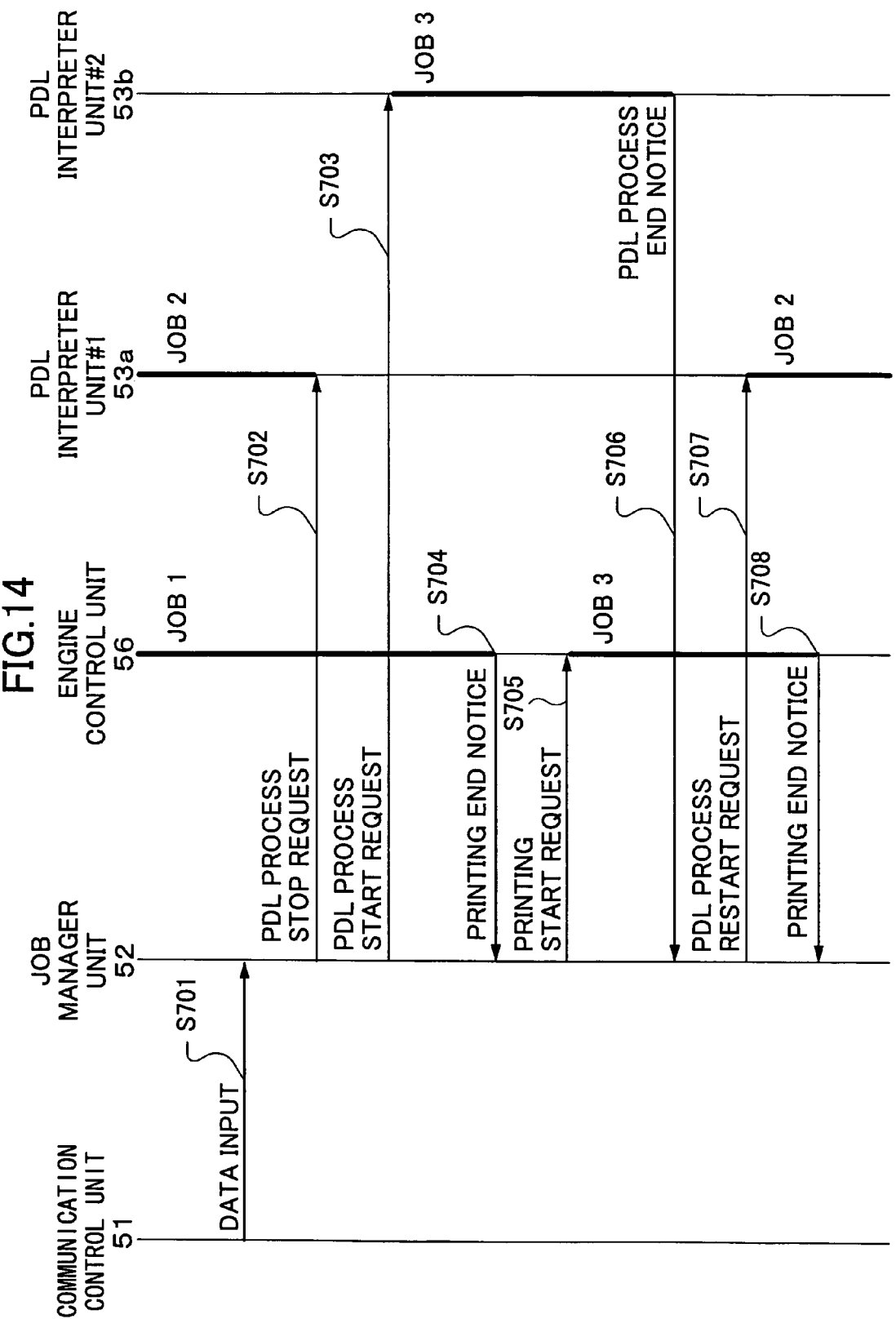
FIG. 14 is a flowchart for explaining the operation of respective modules in the image forming device of embodiment 3 when a job with a high priority is input, which job uses the resource occupied by an in-progress output process.

FIG. 14 is a flowchart for explaining the operation of respective modules in the image forming device of embodiment 3 when a job with a high priority which uses the resource occupied by the in-progress printout process is input. Suppose that the PDL interpreter unit supports the interruption process.

First, in step S701, data from the communication control unit 51 is input to the job manager unit 52. In the engine 42 at this time, the output process of the first job is executed by the engine control unit 56, and the PDL interpretation process of the second job by the first PDL interpreter unit 53a is executed by the PDL control unit 524.

The priority of the third job of the outputting of the input data is higher than each priority of the first job and the second job.

When it is detected by using the PDL control unit 524 that the first PDL interpreter unit 53a supports the interruption process, the job manager unit 52 in step S702 transmits a PDL interpreting process stop request to the first PDL interpreter unit 53a, and the in-progress PDL interpretation process of the second job is caused to suspend.

After the PDL interpretation process is stopped, the job manager unit 52 in step S703 transmits a PDL interpreting process start request to the second PDL interpreter unit 53b, to start the PDL interpretation process of the third job of the data input by the communication control unit 51.

After the output process of the first job by the engine 42 is completed, in step S704, the engine control unit 56 transmits the notice of the end of printing to the job manager unit 52. In response to this notice, in step S705, the job manager unit 52 transmits a printing start request to the engine control unit 56 so that the image data obtained as a result of the PDL interpretation process of the third job performed by the second PDL interpreter unit 53b may be printed. In response, the engine control unit 56 starts the output process of the third job by the engine 42.

After the PDL interpretation process of the third job by the second PDL interpreter unit 53b is completed, in step S706, the second PDL interpreter unit 53b transmits the notice of the end of PDL interpretation to the job manager unit 52.

Accordingly, the job manager unit 52 recognizes that the process by the second PDL interpreter unit 53b was completed.

Next, in step S707, the job manager unit 52 transmits a restart request of PDL process to the first PDL interpreter unit 53a, and the PDL interpretation process of the second job stopped in previous step S702 is caused to restart.

After the output process of the third job by the engine 42 is completed, in step S708, the engine control unit 56 transmits the notice of the end of printing to the job manager unit 52.

Accordingly, the job manager unit 52 recognizes that the printing of data with a high priority at the head end of the output sequence was completed, and cancels the head-end data stored in the output sequence storing unit 521.

As mentioned above, in the image forming device of embodiment 3, even in the case when the in-progress printout process cannot be suspended at an end or stop of the PDL interpretation process, the output sequence is controlled after the printout process is completed so that the job with a high priority can be processed first.

Embodiment 4

The image forming device of the embodiment 3 can wait for the end of the in-progress job, when the in-progress job and the input job with a high priority use the same resource. However, there is a case in which such a process cannot be performed by an actual printer, and the printing conditions can be known only from the result processed by the PDL interpreter unit. In this case, the determination as to whether the in-progress job and the input job with a high priority use the same resource is impossible in the stage before the PDL interpretation process of a job with a high priority is performed by a PDL interpreter unit.

To eliminate the problem, the image forming device of embodiment 4 is arranged so that, when a job with a high priority is input while the job of the printing method which occupies a specific resource is performed, the image forming device is held in a waiting state to wait for the end of the in-progress job, and the output process of the job with a high priority may be performed after the end of the in-progress job.

Figure 15:
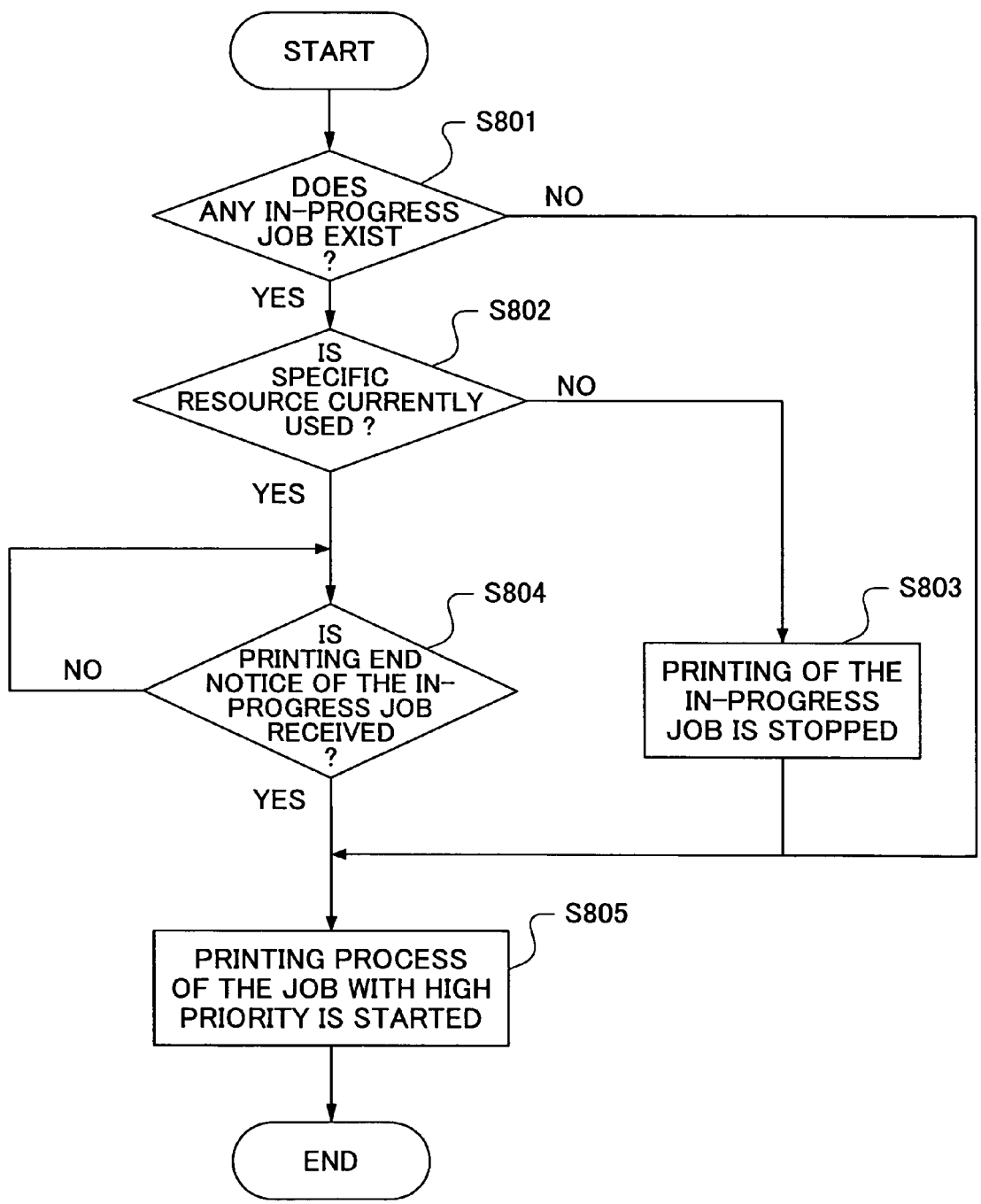
FIG. 15 is a flowchart for explaining the operation of a job process of the image forming device of a fourth embodiment of the invention (embodiment 4).

FIG. 15 is a flowchart for explaining the operation of the job process of the image forming device of embodiment 4.

If new data from the communication control unit 51 is transmitted to the job manager unit 52, the job manager unit 52 determines its priority as in the embodiment 1 (step S101 of FIG. 5).

When the determined priority is higher than that of the object job of each of the in-progress PDL interpretation process and the output process, and the in-progress PDL interpretation process by the PDL interpreter unit is suspended (in the embodiment 1) or ended (in the embodiment 2) at the time of reception of the data transmitted.

Then, after the PDL interpretation process is stopped or completed, in step S801, the job manager unit 52 determines whether there is any job for which the output process by the engine 42 is performed, based on the data (as shown in FIG. 9)) stored in the output sequence storing unit 521.

If there is no in-progress output process, the control progresses to step S805.

On the other hand, when the output process by the engine 42 is in progress, in step S802, the job manager unit 52 determines whether the specific resource of the image forming device is currently used by the in-progress output process by the engine 42, based on the data stored in the output sequence storing unit 521.

If neither of the resources is currently used, the control progresses to step S803. In step S803, the job manager unit 52 causes the output sequence changing unit 523 to change the output sequence stored in the output sequence storing unit 521 so that the input data whose priority is higher than that of other in-progress jobs may be processed preferentially, and causes the request transmitting unit 525 to transmit a printing stop request to the engine control unit 56, so that the engine 42 is made to stop the in-progress output process.

On the other hand, when the specific resource is currently used, in step S804, the job manager unit 52 causes the output sequence changing unit 523 to change the output sequence stored in the output sequence storing unit 521 so that the input data with a high priority may be processed preferentially after the in-progress output process is completed, and the job manager unit 52 is held in a waiting state until the notice of an end of the in-progress output process by the engine 42 is received from the engine control unit 56.

After the in-progress output process is stopped or completed, in step S805, the job manager unit 52 causes the request transmitting unit 525 to transmit a PDL interpreting process start request to a PDL interpreter unit other than the PDL interpreter unit which was performing PDL interpretation process previously, through the PDL control unit 524, so that the PDL interpretation process of data with a high priority input from communication control unit 51 is made to start.

Moreover, the job manager unit 52 causes the request transmitting unit 525 to transmit a printing start request to the engine control unit 56, so that the image data obtained as a result of the PDL interpretation process may be printed. In response, the engine control unit 56 starts the output process by the engine 42.

Alternatively, rather than performing the PDL interpretation process and the output process of data with a high priority in parallel after the end of the previous in-progress output process, the PDL interpretation process of the data with a high priority may be performed in advance, immediately after the stop or end of the previous in-progress PDL interpretation process, to improve the process efficiency of the image forming device.

Embodiment 5

In the above-mentioned embodiment, the method of stopping or completing the output process after the PDL interpretation process is stopped or completed has been considered. However, if the image forming device is constituted in embodiment 4 so that the output process of a job with a high priority may be performed after waiting until there is certainty that the print job has ended, a problem may arise when the in-process printing job and the in-process PDL expansion job are the same and the in-process printing job occupies a specific resource of the image forming device.

In the embodiment 4, if a PDL interpreter unit supports interruption process and a job whose priority is higher than that of an active job for which the PDL interpretation process is executed by the PDL interpreter unit is newly input, the in-progress PDL interpretation process at that time will be suspended in order to process the newly input job preferentially. In this case, if the object job of each of the in-progress PDL interpretation process and the output process is the same at the time of inputting the new job with a high priority, it is impossible to make the output process complete in the state where the PDL interpretation process is not completed. At this time, the job manager unit cannot receive a notice of the end of printing from the engine control unit, the image forming device is held in a deadlock state, and the output process of the newly input job with a high priority cannot be performed.

To eliminate the problem, the image forming device of embodiment 5 is arranged so that the image forming device may detect whether the object job of each of the in-progress PDL interpretation process and output process is the same, before suspending the PDL interpretation process.

FIG. 16 is a flowchart for explaining the operation of the job process of the image forming device of embodiment 5.

If new data from the communication control unit 51 is transmitted to the job manager unit 52, a priority is determined by the job manager unit 52 as in embodiment 1 (step S101 of FIG. 5).

When the determined priority is higher than that of the object job of each of the in-progress PDL interpretation process and the output process, in step S901, the job manager unit 52 determines whether the object job of each of the in-progress PDL interpretation process and the output process is the same, based on the data (as shown in FIG. 9) stored in the output sequence storing unit 521.

When it is determined that the job for which the PDL interpretation process is performed by one of the PDL interpreter units is not the same as the job for which the output process is performed by the engine 42, in step S903, the job manager unit 52 causes the request transmitting unit 525 to transmit a PDL interpretation process stop request to the PDL interpreter unit which is performing the PDL interpretation process, via the PDL control unit 524, to suspend the in-progress PDL interpretation process.

Moreover, the job manager unit 52 in step S904 causes the request transmitting unit 525 to transmit a printing stop request to the engine control unit 56, to make the engine 42 stop the in-progress output process.

On the other hand, when the job for which the PDL interpretation process is performed by one of the PDL interpreter units is the same as the job for which the output process is performed by the engine 42, in step S902, the job manager unit 52 determines whether the specific resource of the image forming device is currently used by the in-progress output process by the engine 42, based on the data stored in the output sequence storing unit 521. If neither of the resources is currently used, the control progresses to step S903.

On the other hand, when it is determined that the specific resource is currently used, in step S905, the job manager unit 52 causes the output sequence changing unit 523 to change the output sequence stored in the output sequence storing unit 521 so that input data with a high priority may be processed preferentially after the in-progress output process is completed, and the job manager unit 52 is held in a waiting state until the notice of an end of the in-progress output process by the engine 42 is received from the engine control unit 56.

After the in-progress output process is stopped or completed, in step S906, the job manager unit 52 causes the request transmitting unit 525 to transmit a PDL interpreting process start request to a PDL interpreter unit other than the PDL interpreter unit which was performing the PDL interpretation process previously, via the PDL control unit 524, and the PDL interpretation process of the data with a high priority input from the communication control unit 51 is made to start.

Moreover, the job manager unit 52 causes the request transmitting unit 525 to transmit a printing start request to the engine control unit 56 so that the image data obtained as a result of the PDL interpretation process may be printed. In response, the engine control unit 56 starts the output process by the engine 42.

When waiting for the end of printing of the in-progress job in step S905, the PDL interpretation process of the job is completed, but it is necessary to process the job with a high priority, and the following job is not processed according to the reception sequence of the jobs.

In step S906, the PDL interpretation process and the output process of the job with a high priority are performed in parallel. Alternatively, immediately after the PDL interpretation process of a job with a low priority is completed, the PDL interpretation process of the job with a high priority may be started while waiting for the end of the printing process in step S905, in order to improve the process efficiency of the image forming device.

In embodiment 5, in order to incorporate the process (embodiment 2) when the PDL interpreter unit does not support the interruption process, the step S903 of FIG. 16 may be replaced by the steps S401-S403 of FIG. 10.

FIG. 17 is a sequence diagram for explaining the operation of respective modules in the image forming device of this embodiment when the object job of each of the in-progress PDL interpretation process and the printout process is the same. Suppose that the PDL interpreter unit supports the interruption process.

Then, in step S1001, data from the communication control unit 51 is input to the job manager unit 52. At this time, the output process of the first job by the engine 42 is executed by the engine control unit 56, and the PDL interpretation process of the first job by the first PDL interpreter unit 53*a* is executed by the PDL control unit 524.

Suppose that the priority of the second job concerning the outputting of the input data is higher than the priority of the first job.

If the job for which the PDL interpretation process is performed by the first PDL interpreter unit 53*a* is different from the job for which the output process is not performed by the engine 42, the job manager unit 52 performs the process as in the embodiments 2-4. Specifically, when it is determined by using the PDL control unit 524 that the first PDL interpreter unit 53*a* supports the interruption process, the job manager unit 52 transmits a PDL interpreting process stop request to the first PDL interpreter unit 53*a*, and the in-progress PDL interpretation process is made to suspend.

However, in embodiment 5, the job manager unit 52 is held in a waiting state until the first PDL interpreter unit 53*a* transmits the notice of the end of PDL interpretation process of the first job to the job manager unit 52 in step S1002.

In the case where it is determined, based on the data (as shown in FIG. 9) stored in the output sequence storing unit 521, that the specific resource of the image forming device currently used by the in-progress output process by the engine 42 is used by the output process of the second job with a high priority (as in the embodiment 3), the job manager unit 52 is held in a waiting state until the engine control unit 56 transmits the notice of the end of printing of the first job to the job manager unit 52 in step S1003.

After the output process of the first job by the engine 42 is completed, the job manager unit 52 transmits a PDL interpreting process start request to the second PDL interpreter unit 53*b*, to start the PDL interpretation process of the second job of the data input by the communication control unit 51 in step S1004.

Successively with step S1004, the job manager unit 52 in step S1005 transmits a printing start request to the engine control unit 56 so that the image data obtained as a result of the PDL interpretation process of the second job performed by the second PDL interpreter unit 53*b* may be printed. In response, the engine control unit 56 starts the output process of the second job by the engine 42.

After the PDL interpretation process of the second job by the second PDL interpreter unit 53*b* is completed, the second PDL interpreter unit 53*b* in step S1006 transmits the notice of the end of PDL interpretation to the job manager unit 52. Accordingly, the job manager unit 52 can recognize that the process by the second PDL interpreter unit 53*b* was completed.

After the output process of the third job by the engine 42 is completed, the engine control unit 56 in step S1007 transmits the notice of the end of printing to the job manager unit 52. Accordingly, the job manager unit 52 recognizes that the printing of data with a high priority at the head end of the output sequence was completed, and the job manager unit 52 cancels the head-end data stored in the output sequence storing unit 521.

As mentioned above, when a job with a high priority is input to the image forming device of this embodiment, it is determined whether the object job of each of the in-progress PDL interpretation process and the printout process is the same. The output sequence is controlled according to the result of the determination so that the job with a high priority may be processed. It is possible to insert a job with a high priority as a following job, while avoiding occurrence of a deadlock of the image forming device.

Embodiment 6

In the above embodiment, when the job with a high priority is input but the PDL interpretation process or the printout process is not able to be suspended, the method for inserting a job with a high priority as a following job appropriately has been described.

However, in the actual image forming device, it is not necessarily easy to insert a job with a high priority, upon inputting of the same, after the end of the in-progress printout process. This is because neither the PDL interpretation process nor the printout process is suspended immediately in response to the stop request from the job manager unit.

In order to obviate the problem, the image forming device of this embodiment does not suspend the printout process after the PDL interpretation process is stopped, but it is arranged so that the stop requests of the two processes are transmitted successively or simultaneously.

FIG. 18 is a sequence diagram for explaining the operation of respective modules in the image forming device of this embodiment in which respective stop requests are transmitted successively or simultaneously to the in-progress PDL interpretation process and printout process at a time of receiving a job with a high priority. Suppose that the PDL interpreter unit supports the interruption process.

Then, in step S1101, data from the communication control unit 51 is input to the job manager unit 52. In the engine 42 at this time, the output process of the first job is executed by the engine control unit 56, and the PDL interpretation process of the second job by the first PDL interpreter unit 53a is executed by the PDL control unit 524.

The priority of the third job concerning the outputting of the input data is higher than each priority of the first job and the second job.

If it is determined that the first PDL interpreter unit 53a supports the interruption process by the PDL control unit 524, the job manager unit 52 in step S1102 causes the request transmitting unit 525 to transmit a PDL interpreting process stop request to the first PDL interpreter unit 53a via the PDL control unit 524.

If the PDL interpretation process is immediately suspended by the stop request from the job manager unit 52, as it is for embodiment 3, the job manager unit 52 causes the second PDL interpreter unit 53b to perform the PDL interpretation process of the newly input third job immediately after the transmitting of the PDL interpreting process stop request to the first PDL interpreter unit 53a (refer to FIG. 14).

However, a time lag may exist in the actual image forming device between the time the stop request is generated and the time the process is actually stopped, which depends on the content of the in-progress PDL interpretation process.

If the end of the output process of the first job by the engine 42 is earlier than the stop of the PDL interpretation process of the second job, the PDL interpretation process of the newly input third job is not yet started at that time, and the printout process of other jobs for which the PDL interpretation process is already completed will be performed in advance of the third job.

In order to eliminate the problem, the job manager unit 52 in step S1103 causes the request transmitting unit 525 to transmit a printing stop request to the engine control unit 56 successively or simultaneously with step S1102.

After the output process of the first job by the engine 42 is completed, the engine control unit 56 in step S1104 transmits the notice of the end of printing to the job manager unit 52.

In response to this notice, the job manager unit 52 is held in a waiting state until the PDL interpretation process of the first job by the first PDL interpreter unit 53a stops in step S1105.

After the PDL interpretation process is stopped, in step S1106, a PDL interpreting process start request is transmitted to the second PDL interpreter unit 53b through the PDL control unit 524 by using the request transmitting unit 525, and the PDL interpretation process of the third job of the data input by the communication control unit 51 is made to start.

In step S1107, the job manager unit 52 transmits a printing start request to the engine control unit 56 by using the request transmitting unit 525 so that the image data obtained as a result of the PDL interpretation process of the third job performed by the second PDL interpreter unit 53b may be printed.

In response, the engine control unit 56 starts the output process of the third job by the engine 42.

After the PDL interpretation process of the third job by the second PDL interpreter unit 53b is completed, the second PDL interpreter unit 53b in step S1108 transmits the notice of the end of the PDL interpretation to the job manager unit 52.

Accordingly, the job manager unit 52 recognizes that the process by the second PDL interpreter unit 53b is completed.

Next, in step S1109, a PDL process restart request is transmitted to the first PDL interpreter unit 53a via the PDL control unit 524 by using the request transmitting unit 525, and the PDL interpretation process of the second job stopped in previous step S1105 is made to restart.

After the output process of the third job by the engine 42 is completed, the engine control unit 56 in step S1110 transmits the notice of the end of printing to the job manager unit 52.

Accordingly, the job manager unit 52 recognizes that printing of data with a high priority at the head end of the output sequence was completed, and cancels the head-end data stored in the output sequence storing unit 521.

Embodiment 7

In embodiment 6, the problem resulting from a time lag between the time the process is actually suspended and the time the stop request is generated can be eliminated by transmitting respective stop requests successively or simultaneously to the PDL interpretation process and the printout process.

However, the image forming device according to embodiment 6 may be used when the PDL interpreter unit supports the interruption process, but a problem arises when the PDL interpreter unit does not support the interruption process.

If the PDL interpreter unit does not support the interruption process, the PDL interpretation process of a job with a high priority will be started after all of the processes of the in-progress job are completed.

On the other hand, if the printout process can be stopped in response to a stop request, the storage area (memory or area of a hard disc drive (HDD)) in which the image data for the in-progress printing job is stored is not released and remains non-processed.

In this case, if the data for which the PDL interpretation process cannot be suspended occupies a large amount of storage area, as long as the in-progress job has ended and the storage area is released, a sufficiently large storage area for the job for the in-progress PDL interpretation process cannot be secured. Also, the PDL interpretation process may be in the state where it cannot be terminated and the image forming device may experience a deadlock.

In order to eliminate this problem, the image forming device of this embodiment is arranged so that, only when the PDL interpreter unit does not support the interruption process, the in-progress PDL interpretation process and printout process are not suspended at the same time, and, after the PDL interpretation process is completed, the printout process is suspended.

FIG. 19 is a sequence diagram for explaining the operation of respective modules in the image forming device of this embodiment in which a stop request is transmitted to the printout process after the in-progress PDL interpretation process is completed at a time of receiving a job with a high priority.

First, in step S1201, data from the communication control unit 51 is input to the job manager unit 52. At this time, the output process of the first job by the engine 42 is executed by the engine control unit 56, and the PDL interpretation process of the second job by the first PDL interpreter unit 53a is executed by the PDL control unit 524.

The priority of the third job concerning the outputting of the input data is higher than each priority of the first job and the second job. If it is determined that the first PDL interpreter unit 53a does not support the interruption process by the PDL control unit 524, the job manager unit 52 is held in a waiting state until the in-progress PDL interpretation process of the second job by the first PDL interpreter unit 53a is completed. The starting of the PDL interpretation process of the third job is made to wait.

After the PDL interpretation process of the second job by the first PDL interpreter unit 52a is completed, the first PDL interpreter unit 53a in step S1202 transmits the notice of the end of the PDL interpretation to the job manager unit 52.

In response to this notice, the job manager unit 52 in step S1203 causes the output sequence changing unit 523 to change the output sequence stored in the output sequence storing unit 521 so that the third job may be output preferentially over the other jobs, and causes the request transmitting unit 525 to transmit a printing stop request to the engine control unit 56.

Thereafter, the output process of the first job by the engine 42 is stopped in step S1204. At this time, the job manager unit 52 in step S1205 transmits a PDL interpreting process start request to the second PDL interpreter unit 53b via the PDL control unit 524 by using the request transmitting unit 525, and the PDL interpretation process of the third job of the data input by the communication control unit 51 is started.

In step S1206, the job manager unit 52 transmits a printing start request to the engine control unit 56 by using the request transmitting unit 525, so that the image data obtained as a result of the PDL interpretation process of the third job performed by the second PDL interpreter unit 53b may be printed. In response, the engine control unit 56 starts the output process of the third job by the engine 42.

After the PDL interpretation process of the third job by the second PDL interpreter unit 53b is completed, the second PDL interpreter unit 53b in step S1207 transmits the notice of the end of the PDL interpretation to the job manager unit 52. Accordingly, the job manager unit 52 can recognize that the process by the second PDL interpreter unit 53b was completed.

After the output process of the third job by the engine 42 is completed, the engine control unit 56 in step S1208 transmits the notice of the end of printing to the job manager unit 52.

Accordingly, the job manager unit 52 recognizes that the printing of data with a high priority at the head end of the output sequence was completed, and cancels the head-end data stored in the output sequence storing unit 521.

Next, the job manager unit 52 transmits a printing restart request to the engine control unit 56, and makes the output process of the first job, which was stopped in the previous step S1204, restart in step S1209.

As mentioned above, in the image forming device of this embodiment, when the PDL interpreter unit does not support the interruption process, a process stop request is transmitted to the printout process after the PDL interpretation process is completed. It is possible to place a job with a high priority as a following job while preventing the image forming device from experiencing a deadlock.

The present invention is not limited to the above-described embodiments, and variations and modifications may be made without departing from the scope of the present invention.

For example, in the image forming device of the above-described embodiment, the interruption process is used to the data transmitted via a network from a host device. Alternatively, the data read by the image forming device itself may be interrupted similarly and output preferentially over the data previously input in the image forming device.

The interruption process in the image forming device of the invention may be performed by a program stored in a memory, such as a hard disk drive (HDD) and a read-only memory (ROM) of the image forming device. That is, the interruption process in the image forming device of the invention may be performed by executing the program for performing the interruption process in the image forming device by using an information processing device, such as a computer.

The present application is based on and claims the benefit of priority of Japanese patent application No. 2007-099668, filed on Apr. 5, 2007, the contents of which are incorporated by reference in their entirety.

What is claimed is:

1. An image forming device which forms an image based on input data, comprising:
    an output sequence storing unit storing information concerning the input data, and storing an output sequence according to a reception sequence of reception of items of the information;
    a priority determining unit determining a priority of outputting the input data;
    an output sequence changing unit changing the output sequence stored in the output sequence storing unit in accordance with the priority determined by the priority determining unit;
    a plurality of PDL interpreter units performing image expansion of the input data; and
    a PDL control unit controlling the plurality of PDL interpreter units to perform image expansion of the input data in accordance with the output sequence stored in the output sequence storing unit,
    wherein, when the priority of outputting the input data determined by the priority determining unit is higher than a priority of in-process data during the image expansion performed by at least one of the plurality of PDL interpreter units, the PDL control unit determines whether the at least one of the plurality of PDL interpreter units supports an interruption process, and the output sequence changing unit changes the output sequence stored in the output sequence storing unit such that, when the at least one of the plurality of PDL interpreter units supports the interruption process, another of the plurality of PDL interpreter units performs image expansion of the input data earlier than the image expansion of the in-process data, and when the at least one of the plurality of PDL interpreter units does not support the interruption process, another of the plurality of PDL interpreter units performs the image expansion of the input data later than the image expansion of the in-process data.

2. The image forming device of claim 1, wherein each of the plurality of PDL interpreter units includes a configuration file containing an item indicating whether the PDL interpreter unit supports the interruption process, and the PDL control unit determines whether each PDL interpreter unit supports the interruption process, based on the item contained in the configuration file of the PDL interpreter unit.

3. The image forming device of claim 1, further comprising an output control unit outputting image data obtained as a result of image expansion by each of the plurality of PDL interpreter units, in accordance with the output sequence stored in the output sequence storing unit,
  wherein, when the priority of outputting the input data determined by the priority determining unit is higher than a priority of in-process image data currently output by the output control unit, the output sequence changing unit changes the output sequence stored in the output sequence storing unit such that, when it is determined, from information stored in the output sequence storing unit, that a resource used for outputting the in-process image data is used for outputting image data based on the input data, the image data based on the input data is output later than the outputting of the in-process image data, and when it is determined that the resource is not used for outputting the image data based on the input data, the image data based on the input data is output earlier than the outputting of the in-process image data.

4. The image forming device of claim 3, wherein, when the determination as to whether the resource is used for outputting the image data based on the input data is allowed only from image data obtained as a result of image expansion by each of the plurality of PDL interpreter units, the output sequence changing unit changes the output sequence stored in the output sequence storing unit such that the image data based on the input data is output after the outputting of the in-process image data by the output control unit.

5. The image forming device of claim 3, wherein, when it is determined that the resource is used for outputting the image data based on the input data, the output control unit releases the resource currently used, and the output sequence changing unit changes the output sequence stored in the output sequence storing unit such that the image data based on the input data is output earlier than the outputting of the in-process image data.

6. The image forming device of claim 3, wherein, when it is determined, from the information stored in the output sequence storing unit, that the in-process image data currently output by the output control unit is based on image data obtained as a result of image expansion by one of the plurality of PDL interpreter units, the output sequence changing unit changes the output sequence stored in the output sequence storing unit such that the image data based on the input data is output later than the outputting of the in-process image data.

7. The image forming device of claim 3, further comprising a request transmitting unit which transmits to the PDL control unit a first stop request for suspending image expansion by each of the plurality of PDL interpreter units, and transmits to the output control unit a second stop request for suspending outputting of image data by the output control unit, in accordance with the output sequence stored in the output sequence storing unit,
  wherein the request transmitting unit is arranged to transmit the first stop request and the second stop request successively or simultaneously.

8. The image forming device of claim 7, wherein, when the PDL control unit determines that the at least one of the plurality of PDL interpreter units supports the interruption process, the request transmitting unit transmits the first stop request to the PDL control unit and the PDL control unit suspends image expansion by the at least one of the plurality of PDL interpreter units in response to the first stop request, and causes another of the plurality of PDL interpreter units to perform image expansion of the input data, and when the PDL control unit determines that the at least one PDL interpreter unit does not support the interruption process, the PDL control unit causes another of the plurality of PDL interpreter units to perform image expansion of the input data after the image expansion by the at least one of the plurality of PDL interpreter units is completed.

9. A non-transitory computer-readable recording medium storing a computer-readable program which, when executed by a computer, causes the computer to perform an image forming method for use in an image forming device which forms an image based on input data, the method comprising the steps of:
  storing information concerning the input data, and storing an output sequence according to a sequence of reception of items of the information;
  determining a priority of outputting the input data;
  changing the stored output sequence in accordance with the priority determined in the determining step;
  performing image expansion of the input data in accordance with the output sequence stored in the storing step; and
  determining whether an interruption process is supported for the image expansion, when the priority of outputting the input data is higher than a priority of in-process data during the image expansion,
  wherein the stored output sequence is changed such that, when the interruption process is supported, image expansion of the input data is performed earlier than the image expansion of the in-process data, and when the interruption process is not supported, the image expansion of the input data is performed later than the image expansion of the in-process data.

* * * * *